Figure 1:
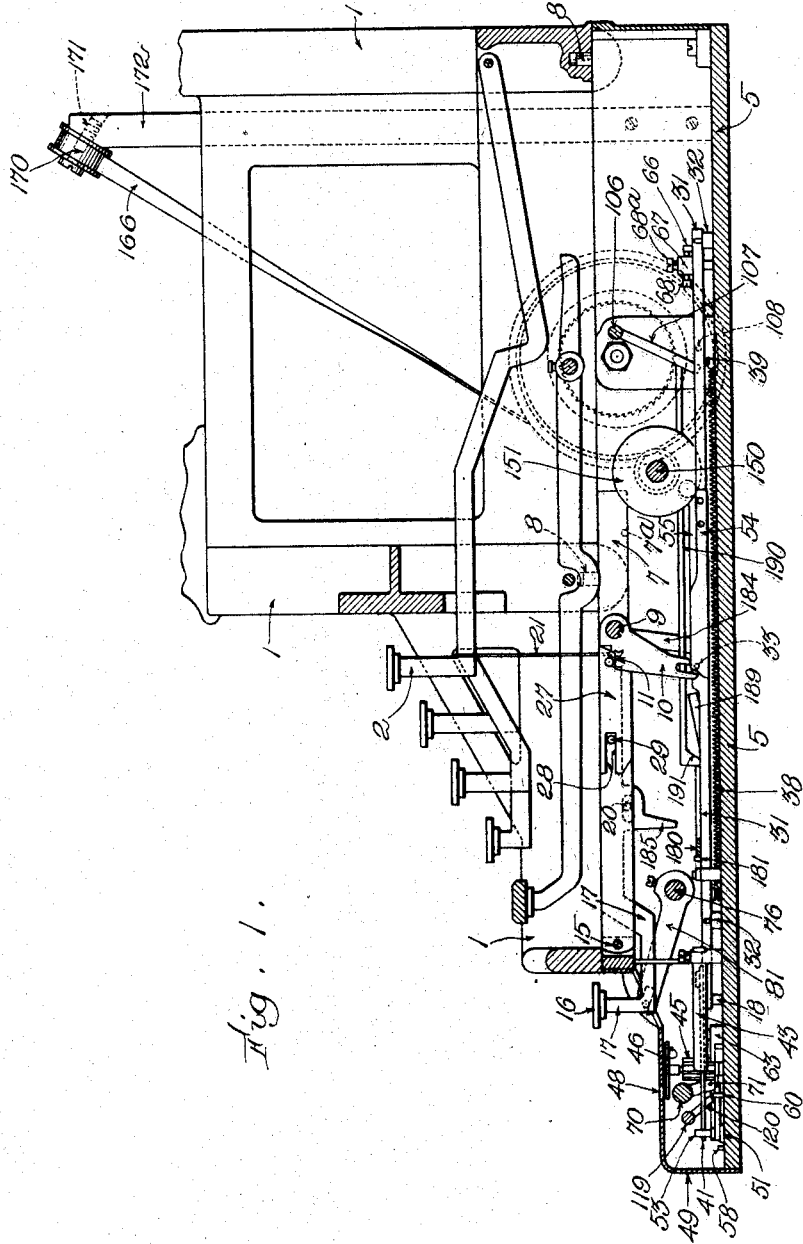

E. H. PALMER & W. S. KINSLEY.
E. M. & H. V. PALMER & W. H. ROBERTS, EXECUTORS OF E. H. PALMER, DEC'D.
CALCULATING MECHANISM.
APPLICATION FILED DEC. 16, 1909.

1,212,247.

Patented Jan. 16, 1917.
9 SHEETS—SHEET 1.

Witnesses:
F. R. Roulstone
O. W. Pizzetti

Inventors:
Edward H. Palmer
and
William S. Kinsley
by Wright, Brown, Quinby & May
Attorneys.

E. H. PALMER & W. S. KINSLEY.
E. M. & H. V. PALMER & W. H. ROBERTS, EXECUTORS OF E. H. PALMER, DEC'D.
CALCULATING MECHANISM.
APPLICATION FILED DEC. 16, 1909.

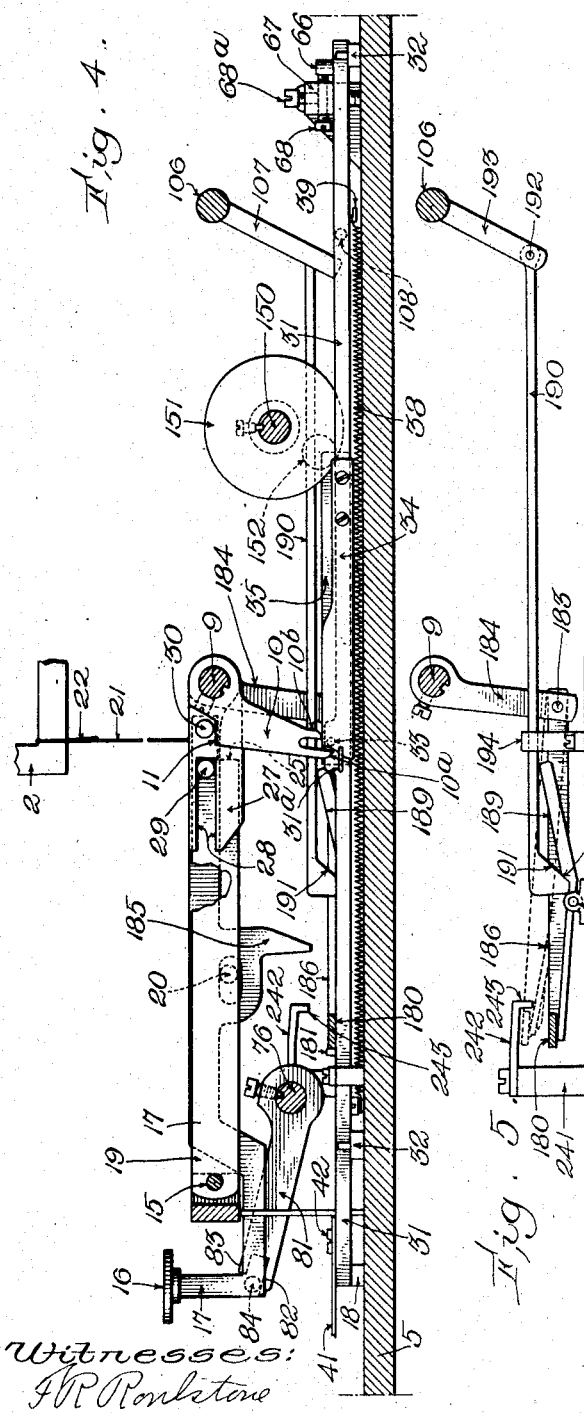

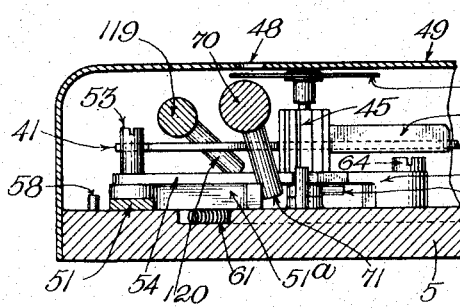
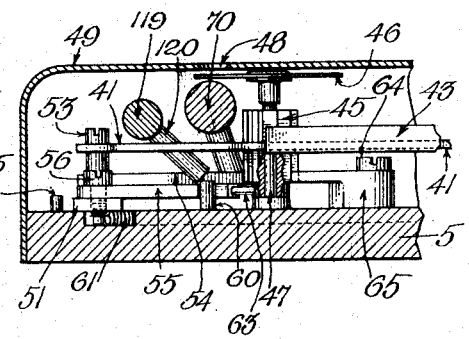
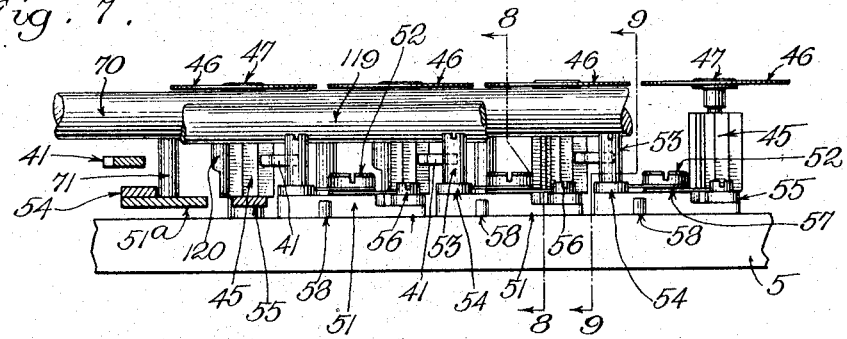
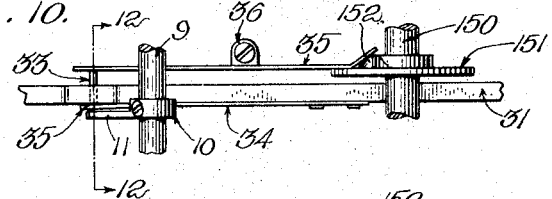
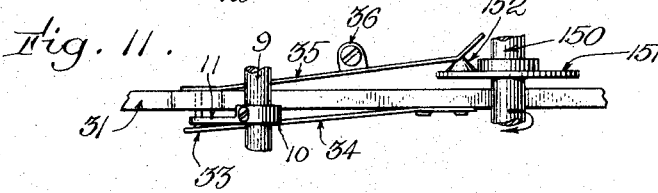
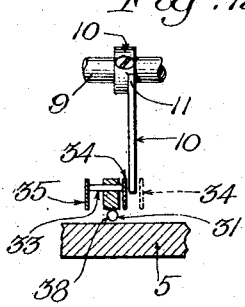

E. H. PALMER & W. S. KINSLEY.
E. M. & H. V. PALMER & W. H. ROBERTS, EXECUTORS OF E. H. PALMER, DEC'D.
CALCULATING MECHANISM.
APPLICATION FILED DEC. 16, 1909.
1,212,247.
Patented Jan. 16, 1917.
9 SHEETS—SHEET 6.
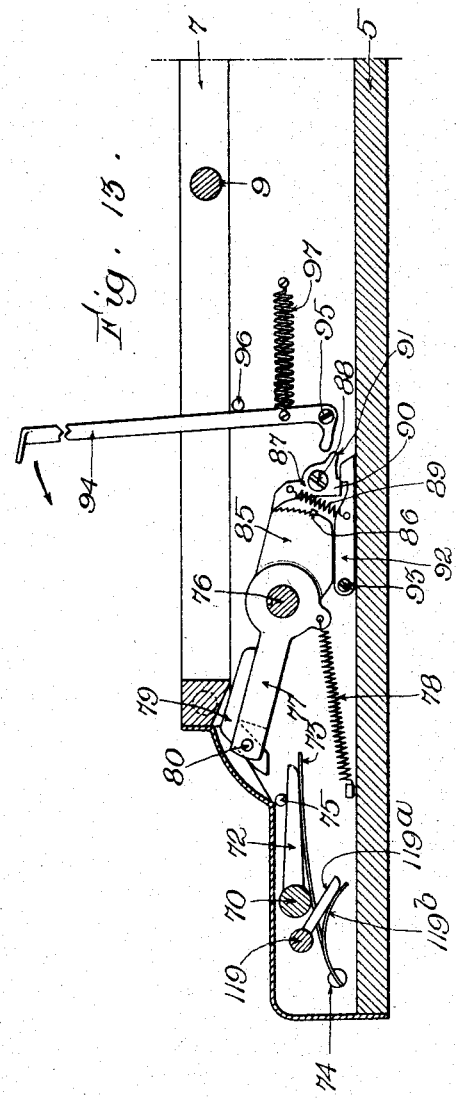
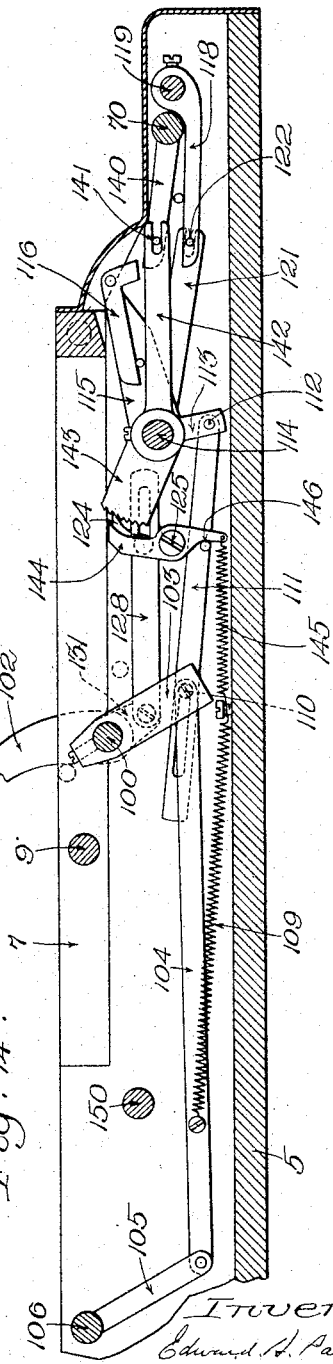

E. H. PALMER & W. S. KINSLEY.
E. M. & H. V. PALMER & W. H. ROBERTS, EXECUTORS OF E. H. PALMER, DEC'D.
CALCULATING MECHANISM.
APPLICATION FILED DEC. 16, 1909.
1,212,247.
Patented Jan. 16, 1917.
9 SHEETS—SHEET 7.
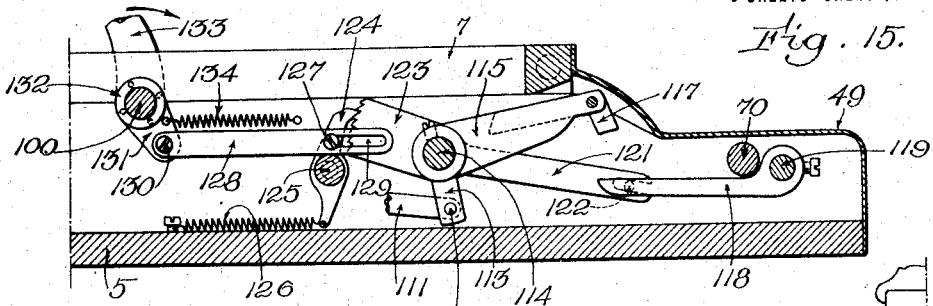
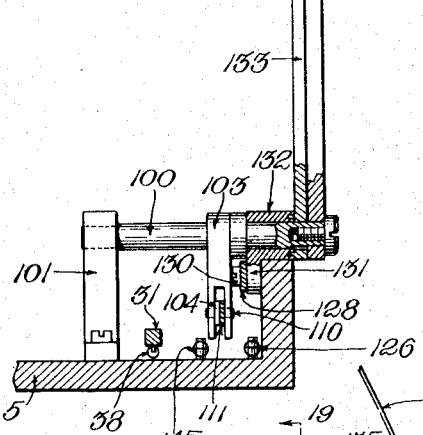
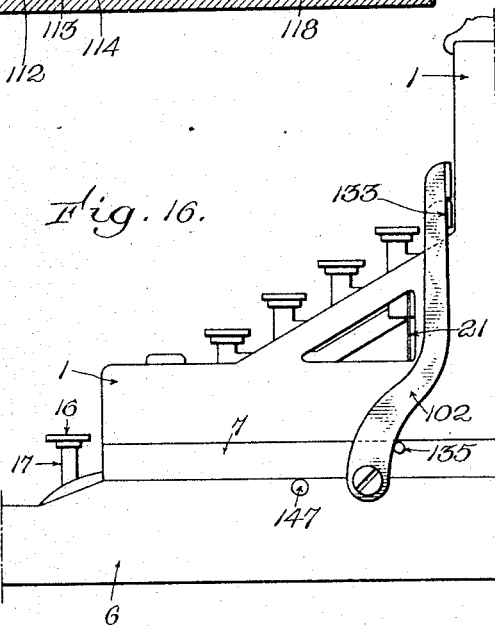
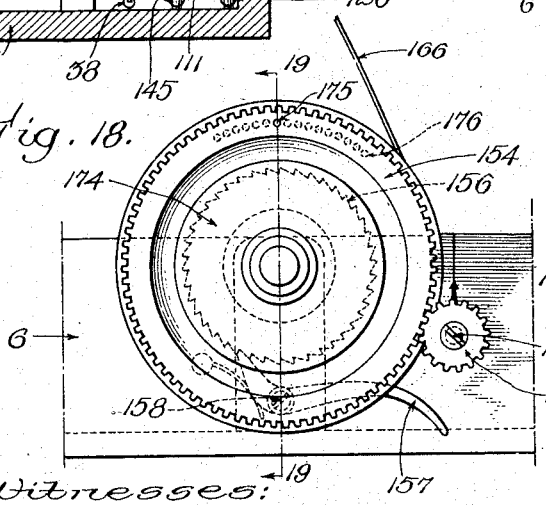
Witnesses:
F. R. Roulstone
P. H. Pezzetti
Inventors
Edward H. Palmer
and
William S. Kinsley
by Wright, Brown, Quinby & Hay
Attorneys.

E. H. PALMER & W. S. KINSLEY.
E. M. & H. V. PALMER & W. H. ROBERTS, EXECUTORS OF E. H. PALMER, DEC'D.
CALCULATING MECHANISM.
APPLICATION FILED DEC. 16, 1909.
1,212,247.
Patented Jan. 16, 1917.
9 SHEETS—SHEET 8.
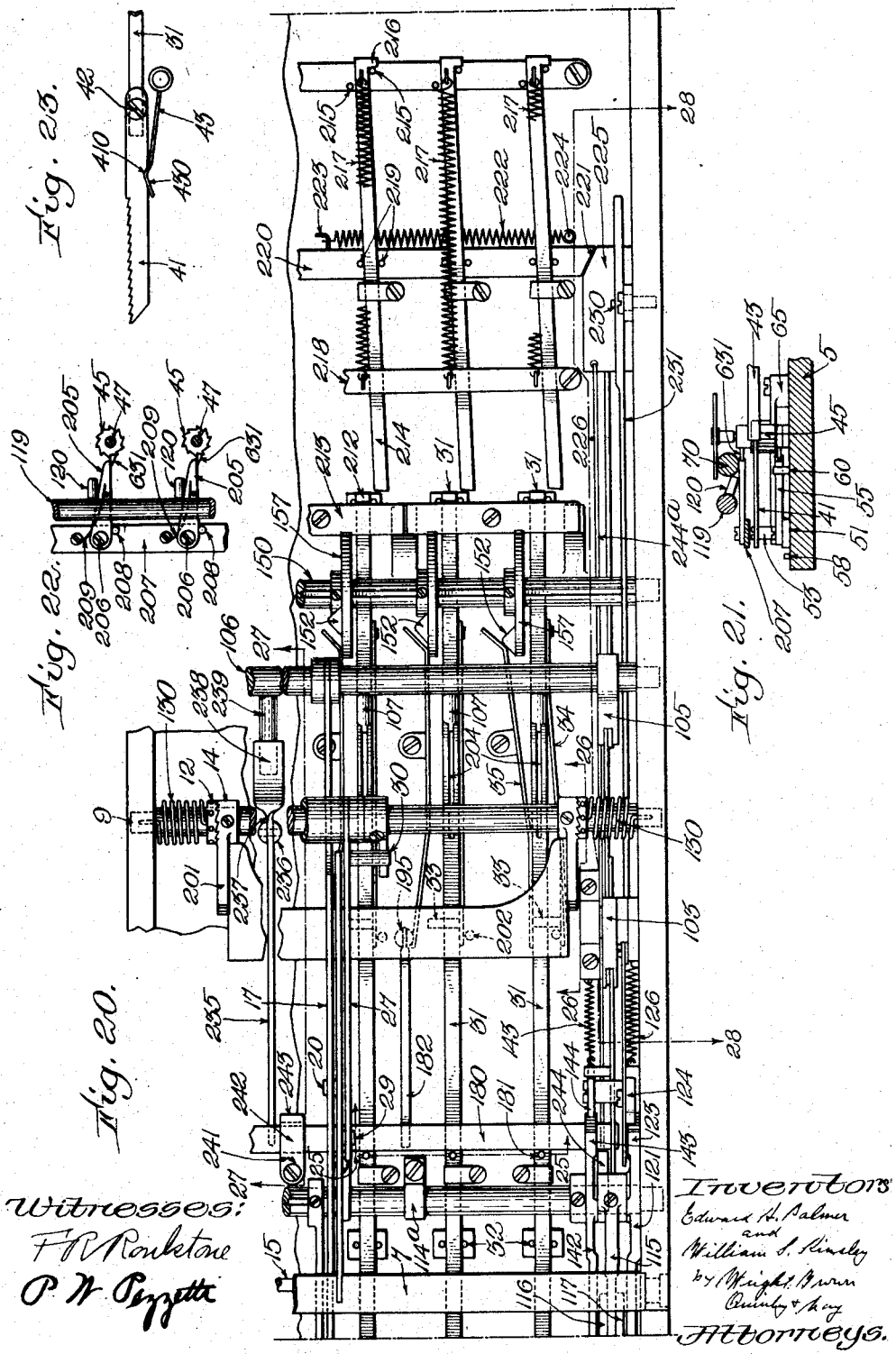

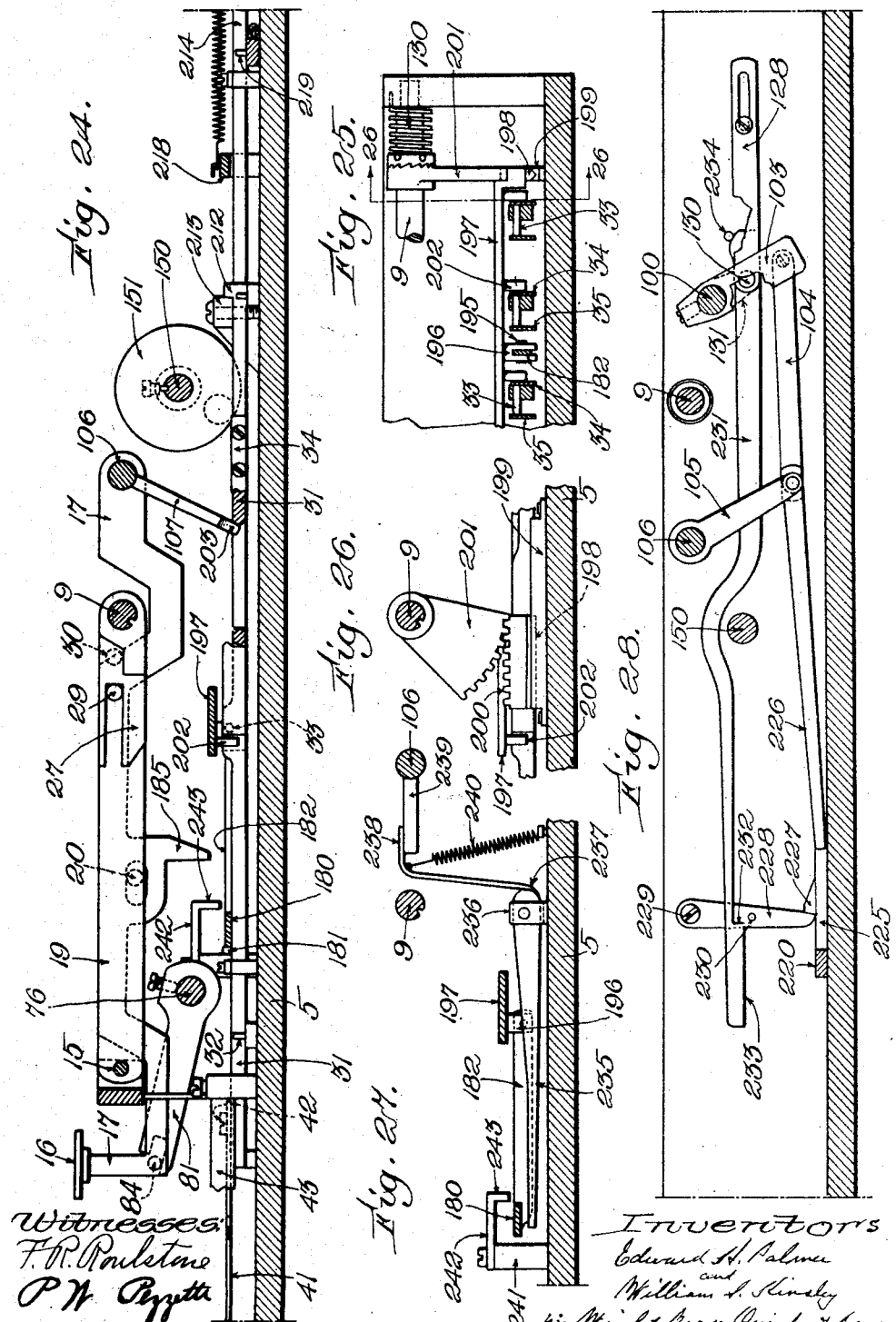

UNITED STATES PATENT OFFICE.

EDWARD H. PALMER AND WILLIAM S. KINSLEY, OF READING, MASSACHUSETTS; SAID KINSLEY ASSIGNOR TO SAID PALMER; EMILY M. PALMER AND HAROLD V. PALMER, BOTH OF READING, MASSACHUSETTS, AND WALTER H. ROBERTS, OF MALDEN, MASSACHUSETTS, EXECUTORS OF SAID EDWARD H. PALMER, DECEASED; SAID EXECUTORS ASSIGNORS TO EMILY M. PALMER AND HAROLD V. PALMER, INDIVIDUALLY.

CALCULATING MECHANISM.

1,212,247. Specification of Letters Patent. Patented Jan. 16, 1917.

Application filed December 16, 1909. Serial No. 533,443.

*To all whom it may concern:*

Be it known that we, EDWARD H. PALMER and WILLIAM S. KINSLEY, both of Reading, in the county of Middlesex and State of Massachusetts, have invented certain new and useful Improvements in Calculating Mechanisms, of which the following is a specification.

This invention relates to calculating apparatus adapted for operation simultaneously with the typewriting machine, under the control of the latter, for indicating totals of figures which are being written upon a sheet by the typewriting machine.

The object of the invention is to improve and simplify mechanisms of this character so that the same may be operated at small expenditure of energy by a person and without the necessity of an additional power-furnishing motor.

A further object is to enable a typewriting machine to which such calculating apparatus is applied or attached to be operated independently of the latter, without effecting a change in the indication of numbers and without the necessity of disconnecting any parts or manipulating a shift key or the like.

Still further objects of our invention are to provide a machine which is efficient, capable of being operated by persons having the degree of skill of the average typewriter operator, which is not liable to get out of order and is simple and economical to construct.

Figure 2:
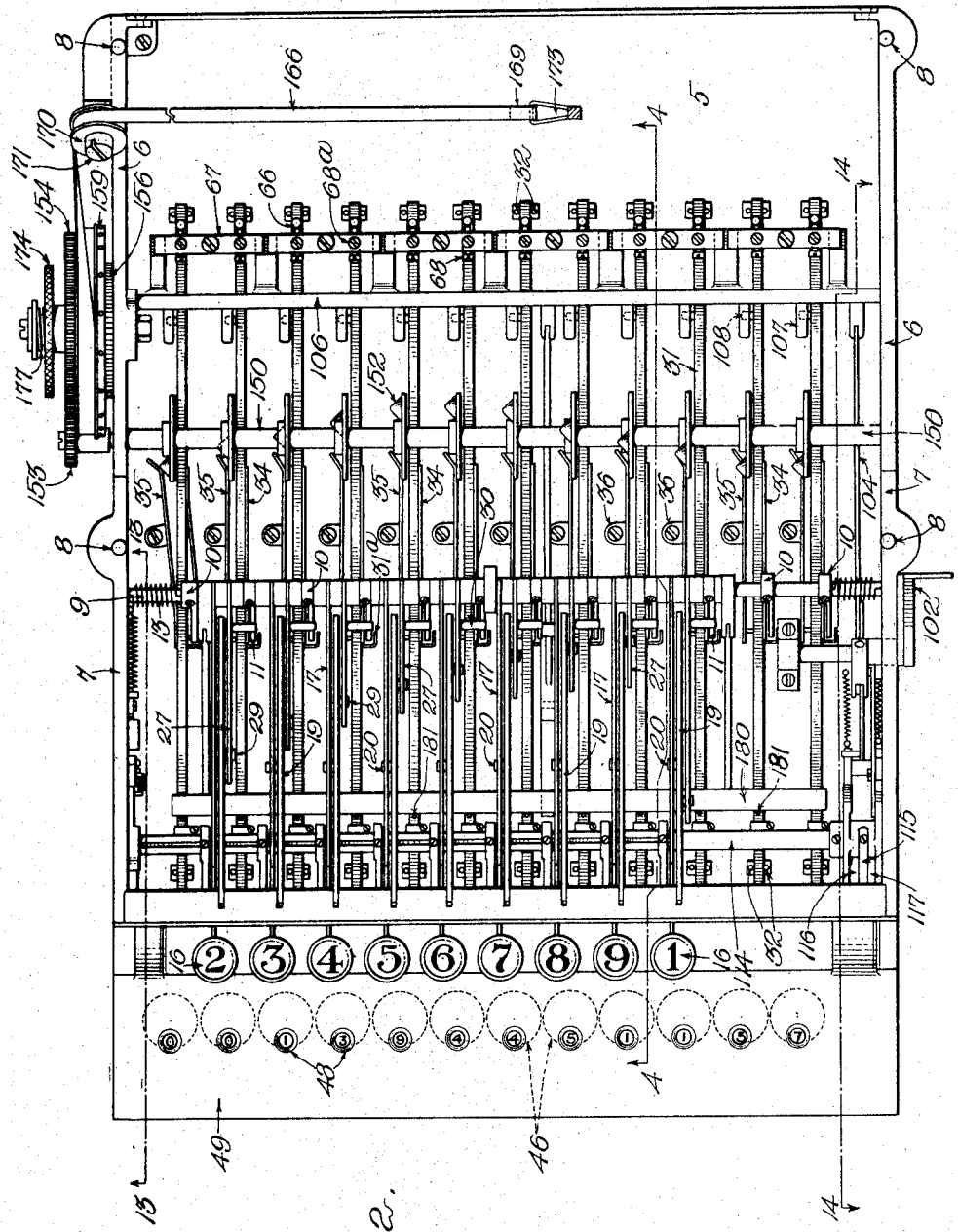
Figure 3:
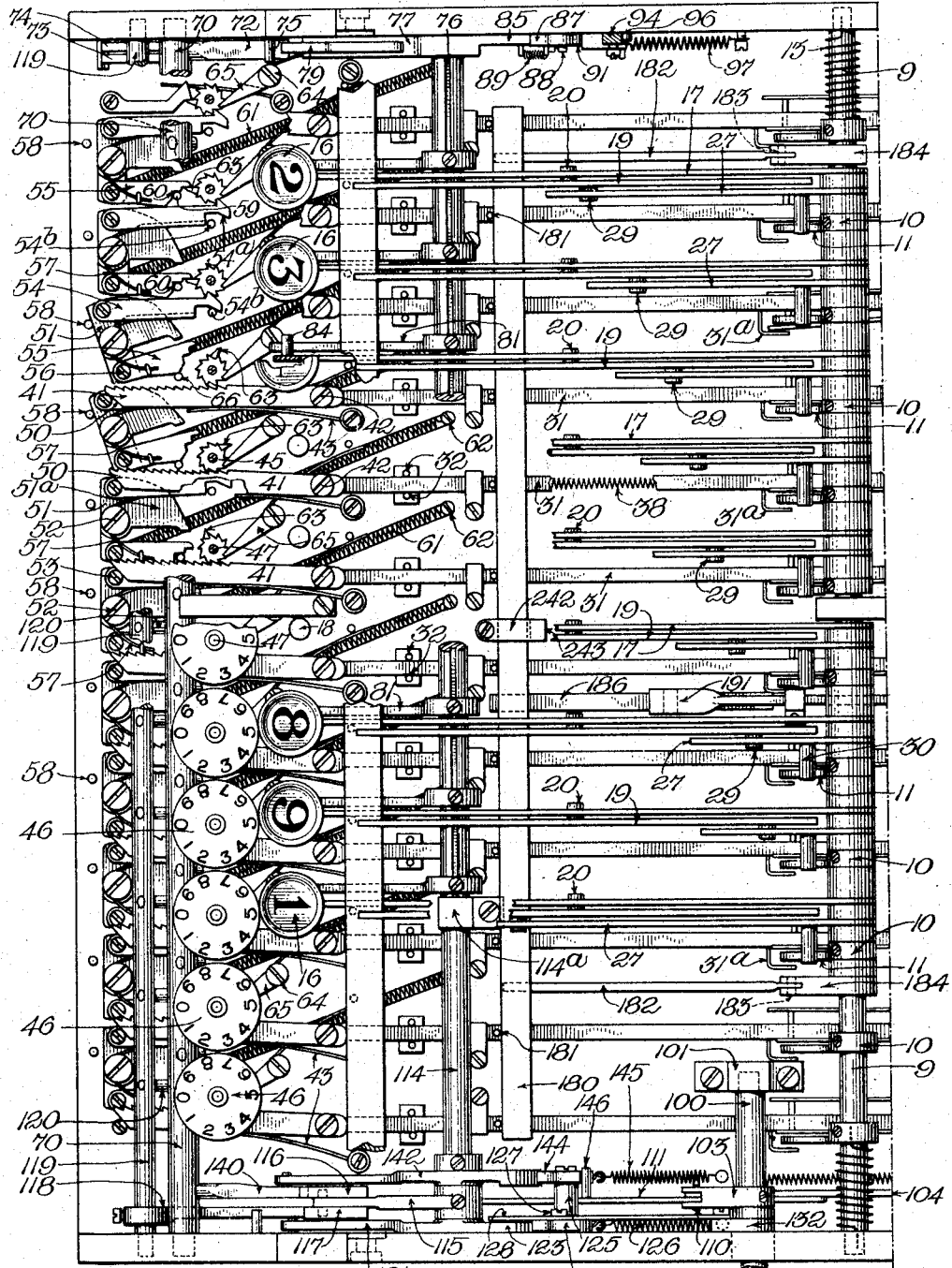

Of the accompanying drawings:—Figure 1 represents a longitudinal section of an apparatus embodying our invention, in position beneath, so as to be used in connection with, a typewriting machine of a well-known type. Fig. 2 is a plan view of the same, the typewriting machine being removed. Fig. 3 is a plan view on a larger scale, of the manual operating parts. Fig. 4 represents a section on line 4—4 of Fig. 2, on a larger scale. Fig. 5 is a detail side elevation of some of the parts shown in Fig. 4. Fig. 6 is a detail side elevation to illustrate the action and positions of some of the parts when the finger key of the apparatus is depressed. Fig. 7 represents a detail front elevation, enlarged, of the indicators and their ratchet-toothed pinions, and some of the immediately co-acting parts. Fig. 8 represents a section on line 8—8 of Fig. 7. Fig. 9 represents a section on line 9—9 of Fig. 7. Figs. 10 and 11 are detail plan views of the devices employed in this embodiment of the invention, for selecting the connection to be made between a manually operated key and the counter actuator, said two figures representing the parts in different positions. Fig. 12 represents a section on the line 12—12 of Fig. 10. Fig. 13 represents a section on line 13—13 of Fig. 2, some parts being omitted. Fig. 14 represents a section on line 14—14 of Fig. 2. Fig. 15 is a view similar to a portion of Fig. 14 but omitting some of the parts. Fig. 16 is a detail side elevation of the resetting levers. Fig. 17 is a detail view representing an elevation from the left of Fig. 16, on a larger scale, and partly in section. Fig. 18 is an elevation of part of the selecting mechanism by which the connection is made with the counter actuators at the proper positions of the typewriter carriage. Fig. 19 represents a section on line 19—19 of Fig. 18. The figures so far described all relate to one embodiment of our invention. The following figures illustrate modifications or changes in some of the details which really constitute a preferred embodiment. Fig. 20 is a detail plan view on a larger scale than Fig. 2. Fig. 21 is a detail sectional view, partly in elevation, of one of the ratchet pinions and the immediately co-acting parts. Fig. 22 is a detail plan view of some of the parts shown in Fig. 21. Fig. 23 is a detail plan of one of the rack arms and spring co-acting therewith. Fig. 24 is a view similar to Fig. 4 but showing some of the preferred structures of details. Fig. 25 represents a section on line 25—25 of Fig. 20. Fig. 26 represents a section on line 26—26 of Fig. 25. Fig. 27 represents a section on line 27—27 of Fig. 20. Fig. 28 represents a section on line 28—28 of Fig. 20 looking in the direction of the arrows.

Similar reference characters indicate the same or similar parts in all of the views.

The embodiment of the invention illustrated in the drawings is designed for operation in connection with one of the standard models of typewriting machines, such as the "Underwood." It is to be understood, however, that the invention is equally as well adaptable to use in connection with other typewriting machines, sometimes with more or less minor modifications in certain of its parts and the arrangement thereof to meet such slightly varying conditions as are brought about by different designs of typewriter frames and arrangements of writing keys.

In the drawings, the frame of the typewriting machine is indicated at 1, said machine having the usual set of keys, those in the upper row, indicated at 2, being the ones which are operated when figures are written upon a sheet carried by the typewriter. Accordingly the levers 2 may be considered, and referred to as, the number key levers of the typewriter.

The typewriting machine rests on the calculating mechanism, which latter is an entirely separate and detachable device having a base 5 and inclosing side and end frames, the side frame being indicated at 6 and each side frame consisting in part of a detachable piece or member 7. For convenience of illustration, the base 5 is shown as solid; but in practice it would usually be made with openings to avoid undue weight, and to give access if needed to portions of the calculating apparatus.

When the typewriter is placed upon the frame, it is steadied thereon by means of upright studs 8 on the side frames. Said studs practically constitute dowel pins, adapted to enter the usual holes in the base of the typewriter frame which are employed to receive the screws which are used to attach the customary rubber feet or pads to the base of the typewriter frame.

The inclosing frame of the present mechanism has, as stated, removable side parts 7 which are detachably fixed in position as by suitable screws. These detachable side portions 7 support some of the working parts as hereinafter described. Owing to the removability of said portions 7, the parts carried and supported thereby may be removed from the rest of the mechanism, thereby permitting ready access for adjustment and repairs either to the removed parts or those which remain in the lower portion of the frame.

The varied amounts of movement required to indicate values and tabulate results, are obtained by the proportional angular motion of actuating arms 10 which are firmly keyed at suitable distances apart on a transverse rockshaft 9, said shaft being journaled in the side frame members 7. To normally hold said shaft 9 in such position that the lower ends of its arms 10 will remain in proper normal positions, suitable spiral springs 13 (see Fig. 2) may be mounted upon the shaft 9, each of said springs being fixed at one end to the frame and at the other end to the hub of the nearest arm 10. For reasons hereinafter described, the arms 10 are so formed and connected with the other parts that the lower ends of said arms are about 30° forward of the vertical plane passing through the axis of the shaft 9 which carries said arms.

A rod or bar 15 parallel with the shaft 9 is fixedly mounted in the side frame members 7. Said shaft 9 and rod 15 serve as fulcrums for nine groups of three parallel levers, these groups being designed to impart a rocking motion to shaft 9 of from one to nine gradually differing amounts of angular motion, thereby affording a gradual control of motion corresponding to the proportional values of the nine digits, said values being borne by the finger disks 16 as shown in Fig. 2. These parallel levers are all loosely mounted, the two outside levers of each group being fulcrumed on shaft 9 between two of the several actuating arms 10, and the central lever of each group being loosely mounted on rod 15 and positioned directly under one of the number key levers 2 of the typewriter. A description of one group will serve for all.

The manually operated key lever 17 (Figs. 2, 3, 4 and 5) of each group, (the finger disk 16 being secured to the outer end of such lever 17) is fulcrumed on shaft 9 and extends horizontally forward nearly to rod 15 where it is offset to pass under that shaft permitting its downward motion. Its finger disk 16 of course bears a number to indicate the proportional motion-controlling power of that lever 17. The contact of the upper edge of the lever 17 with the under side of the front bar of the frame 7 prevents any upward motion above the position shown in Figs. 1 and 4, a pin 18 set in the base 5 (see Fig. 6) serving to limit the downward motion of said lever. The purpose of this lever 17 when manually depressed, is to depress the middle or center lever 19 of each group, said lever 19 being fulcrumed on rod 15 and extending horizontally backward and nearly to the shaft 9, said lever 19 carrying a laterally projecting stud 20 which passes under the lever 17. Thus, the depression of a manually operated lever 17, causes the depression of the lever 19 in the same group. As all of the studs 20 of the levers 19 are equidistant from the pivots of said levers, all of the levers 19 are depressed to the same extent when actuated by a lever 17. But by mechanism hereinafter described, the amount of motion imparted to the shaft 9 by the different groups of levers varies according to the numerical values of the several levers 17.

In order that the depression of either finger lever 17 will cause an impression of the proper amount to be made on the paper on the platen of the typewriting machine, there is a connection from each group of levers of the calculating mechanism to the proper number key-lever 2 of the typewriting machine. Since all of the key levers 2 must be actuated to the same extent to do the printing, the connections of said levers 2 with the different groups of levers of the calculating mechanism must be with portions of the latter which have the same amount of movement as the number key levers 2. This requisite amount of motion is found at the rear ends of the levers 19 which, as stated, all have the same amount of movement imparted to them. The connection may be made in various ways but of course in such manner that any lever 2 can be actuated without affecting any part of the calculating mechanism. One suitable connection for this purpose is indicated in Figs. 1, 4 and 6, and comprises a wire 21 looped or hooked at its upper end as at 22 so as to be permanently engaged with the lever 2, the loop or hook being long enough to permit the lever 2 to be given its full downward movement when using the typewriting machine to print numbers without imparting movement to the wire 21. The lower end of the wire passes through an opening 23 near the rear end of lever 19, an enlargement 24 being secured to the wire below the opening 23. This provides a permanent connection between each lever 2 and a lever 19 because the wire is never disconnected at either end. At the same time the connection is a yielding one in that lost motion is provided for the lever 2 in the elongated loop of each wire. Preferably the rear end of the lever 19 is cut out as at 25 to make room for the enlargement 24 which may be any suitable piece of metal clamped on to a crimped portion of the wire 21. Any offset or stop device carried by the wire 21 below the opening 23 in the lever 19 will suffice, so long as the connection be such that actuation of lever 19 will transmit motion to lever 2, while permitting the lever 2 to move downward without actuating the lever 19. The means whereby each lever 17 when depressed will actuate the rockshaft 9 to the proper amount to accord with the value borne by the disk 16 of such lever 17, will now be described:—Each of the three-member groups of levers includes also a lever 27 fulcrumed on shaft 9 and projecting horizontally forward therefrom to different degrees as indicated in Fig. 3. Each lever 27 is forked as at 28 to receive a stud 29 projecting horizontally from the side of the adjacent lever 19. The various studs 29 are positioned at different radial distances from the fulcrums of the several levers 19, and since all of the levers 19 have equal motion downward, the studs travel through paths of various extent, proportional to their distances from the fulcrum rod 15. This is due to the engagement of the studs 29 in the slots 28 of levers 27. Each lever 27 carries a fixed stud 30 near its fulcrum projecting horizontally to the right and passing across and normally just in contact with the shoulder 11 of the adjacent arm 10 which is keyed on the shaft 9. Thus, the swinging motion of the levers 27 to various degrees, cause a varied degree of rocking motion of shaft 9, and to all of the twelve actuating arms 10 keyed thereon.

The angular motion of the arms 10 produced by the operator's finger upon disk 16 so as to depress its lever 17 to its limit, is caused to impart a corresponding proportional amount of horizontal motion to a slide 31, there being as many slides 31 as there are counters or indicators as hereinafter described. These slides are light and rigid, designed for rapid longitudinal reciprocating movement, and are slidingly mounted in ways provided by suitable supports 32 carried by the base plate.

In the accompanying drawings, twelve slides 31 and indicators or counters 46 are shown to permit an indication of any sum from one cent to within one cent of ten billions of dollars. These slides are situated beneath and slightly to the left of the arms 10 and normally just out of contact therewith, so that rocking of the arms 10 will have no effect on any of said slides until a connection is made between the proper arm 10 and slide 31 by the selecting mechanism hereinafter described, and to insure that the indication or counting will be made on the proper one of the row of counters to accord with the location (relatively to the decimal point) of the numeral being printed. At a point just back of where each arm 10, when at rest, overlaps its co-acting slide 31, said slide 31 is transversely bored to receive a pin 33 movable endwise through said slide, and the arm 10 is notched at its lower end to provide two prongs or fingers 10$^a$, 10$^b$, the finger 10$^a$ being longer than the finger 10$^b$. Said pin is held in the slide 31 between a spring 34 and a spring lever 35 (see Figs. 2, 10, 11 and 12). The spring 34 is firmly fastened at its rear end to the slide 31 and its flat end normally lies along the right side of the slide 31 and engages the right hand end of the pin 33. The levers 35 are actuated as hereinafter described, by selecting mechanism, to shift one pin 33 at a time from the normal position shown in Fig. 10 to the position shown in Fig. 11, the latter being the position which the pin must occupy when its slide 31 is to actuate a counter or indicator.

Normally, the arms 10 will swing freely back and forth along the outer side of spring 34, as indicated in Fig. 10. But if a pin 33 be shifted to the position shown in Fig. 11, whatever degree of angular movement is imparted to the arm 10 by the operation of one of the groups of levers, is thus transmitted to the slide 31, drawing the latter backward against the pull of a spring 38 which is connected at its rear end to a hook 39 on the slide, and at its forward end to a pin or screw 40, set into the base plate to constitute an anchorage for the front end of the spring. The springs 38 are always under some tension which is increased when their slides are retracted.

The levers 35 are pivoted at 36 to the base of the machine, and the rear end of each spring lever 35 is preferably bent or offset somewhat for contact with a cam of the selecting means hereinafter described.

Owing to the fact that the lower ends of the arms 10 are considerably forward from the vertical plane of the axis of shaft 9 as hereinbefore described, the ends of said arms swing downwardly at the beginning of their rocking motion. The fingers 10ᵃ of the arms 10 are of such length as to engage a pin 33 when such a pin has been shifted to the position shown in Fig. 11, so as to retract the slide which carries such pin 33. And it is also of such length that when it passes along the other side of a spring 34, it will prevent any possibility of accidental shifting of a pin 33 because the end of such arm 10 acts as an abutment as clearly indicated in Fig. 10 and the full lines in Fig. 12. In said Fig. 12, the dotted line position of the spring 34 indicates the position when said spring has been pushed aside by the operation of a lever 35 forcing the pin 33 through the slide 31. The long finger 10ᵃ of the arm 10 actuates a pin 33 and slide as described, but the shorter finger 10ᵇ of the arm prevents over-motion of the slide and limits the travel thereof to the exact amount necessary for procuring the actuation of the indicator or counter correspondingly to the value of the number key by which it may be operated.

To the forward end of each of the slides is pivoted an arm 41, which is toothed to constitute a rack, said arm 41 being pivotally connected at 42 to said slide bar to permit a slight horizontal lateral movement. A spring 43 acts against the arm 41 so that ratchet teeth 44 formed on one face of the arm 41 will engage with an adjacent vertical pinion 45, said pinion having ten vertical ratchet teeth formed on its periphery. The teeth of the arm 41 and the teeth of the pinion 45 are inclined so that the rack arm 41 will actuate the pinion in but one direction. There are as many of such pinions as there are slides 31 and arms 41. Said pinions 45 are centrally bored, and carried at the upper ends thereof and fixed so as to rotate therewith, are circular indicating disks 46 bearing numerals from zero to nine on their upper faces. Upright spindles 47 firmly fixed in or to the base member of the frame form mountings for the ratchet pinions 45, and the rotation of such ratchet pinions brings the numbers on their indicating disks 46 successively underneath a view point, or beneath adjacent apertures 48, (Fig. 2), cut in a cover plate 49 which covers the forward end of the calculating apparatus frame and reaches back to the forward end of the superposed typewriter frame 1, said cover plate 49 being of course cut out or slotted for the passage of the portions of the levers 17 immediately below the disks 16.

The extreme forward end of the pivoted rack arm 41 of each slide 31 is formed as a wedge 50, its edge being beveled at an angle of approximately 45° with its sides, so formed that at the end of its extreme forward motion, it may contact with an upright pin 53 fixed in a movable arm 51, said arm being pivotally mounted on screw stud 52 fixed in base plate 5. The contact with pin 53 deflects arm 41 at the end of its forward motion, its yielding connection with the slide bar 31, permitting its ratchet teeth to be pressed into contact with those of the ratchet pinion 45, thereby limiting the rotary motion of the latter and locking it against over-motion from momentum.

In order to carry tens from one indicator to the indicator next to the left of that in actuation (see Fig. 3) the short flat bar 51, previously described, which is pivotally mounted on base 5 at 52, carries at its left-hand end a pivotally mounted arm 54 extending backward slightly beyond the ratchet pinion 45 at its left, and said bar 51 carries at its right-hand end an arm 55 pivoted at 56 and terminating a little short of the periphery of the ratchet pinion at its right. Stop pins 58 set in the base 5 limit forward motion of the ends of bars 51 which carry the arm 54. The arm 54 mounted on the left end of bar 51 is finished at its rear end in the form of a ratchet tooth positioned to enter the teeth of the ratchet pinion next adjacent to the left, while the arm 55 pivoted on the right-hand end of bar 51, has a notch 60 cut from its rear end to engage a pin 59 fixed in base plate 5. Both arms are caused to find their operative position by force of a looped spring 57 coiled around screw stud 52 and suitably engaged at its ends with the arms 54 and 55. Each vertical ratchet pinion 45 carries affixed to its lower part, near the surface of base plate 5, a radial projecting tooth 63 so situated that once in each rotation of said pinion, this projecting tooth will contact with pivotally mounted arm 55, rocking it out of connection with restraining pin 59 and permitting a spring 61 attached to bar 51 at slight tension, to swing said bar and move the arm 54 a sufficient distance to rotate the ratchet pinion 45 adjacent at the left, with which it is engaged, one tooth, thereby carrying one ten to the indicator of next higher denomination. It should be observed that the arm 55 normally bears against the stop pin 59 and renders this spring 61 inoperative, but when the radial tooth 63 trips this arm as the figure "9" on the indicating disk passes from beneath the sight opening, the spring is left free to act.

As shown in Figs. 3, 8, and 9, the springs 61 are mounted in channels formed in the base 5, thereby locating the springs below the plane of all moving parts, the outer ends of said springs being secured at 62 to the base.

The upright pin 53, which forms the pivot for arm 54, projects upward and, as has been shown, holds the forward end of the rack arm 41 so as to lock the ratchet pinion to prevent over-rotation thereof, but the movement of lateral bar 51 to carry onto the next indicator also throws pin 53 forward and out of contact with wedge-shaped end 50 of rack arm 41, thereby instantly releasing the lock and permitting the ratchet pinion to be rotated a further amount, bringing the numeral of next higher value to the view point. The right-hand edge of arm 54 is provided with a wedge-shaped projection or cam surface 54ª, commencing nearly opposite its single ratchet tooth and inclined toward the right in approaching the rear end of said arm. When the arm 54 is in its rear position, ready for carrying, and its upright pin 53 is providing a lock against over-motion of a slide bar and its associated ratchet pinion, the cam surface 54ª is just out of contact with an abutment pin 54ᵇ, but instantly upon forward motion of the arm 54 to rotate a ratchet pinion one tooth, this cam edge 54ª contacting with abutment 54ᵇ deflects the rear end of arm 54 toward its ratchet pinion, thereby pressing the point of the ratchet tooth firmly against the pinion and locking it against any greater motion than the one-tenth of a revolution desired. Thus every ratchet pinion is properly locked and unlocked alternately by the movement of arm 54, as required to prevent over-motion in carrying tens, and to permit primary actuation of the ratchet pinion to register numbers directly. By this mechanism an automatic spring-carrying of tens is effected when any indicator disk comes into the zero-indicating position, which is equally effective for carrying through any number of disks, however great, as for carrying to one disk. The carrying device for each disk is individually self-operative, being merely controlled by the next disk to the right, instead of operated by the latter, ⸺ward as is the usual practice. There is thus no limit other than the dimensions of the machine frame to the number of disks which can be employed and correctly actuated.

The slide bars 31 are each provided with a stop 66, (Fig. 4) the contact of which is adjustable by a screw 68 in abutment 67, thereby limiting the forward motion of the actuating bars induced by force of spring 38. A binding screw 68ª may be employed to hold the stop screw 68 in its adjustment.

The rotation of the ratchet pinions 45 and their disks 46 are effected by the forward return of slide bars 31 by their springs 38 after they have been carried back by the arms 10.

Lazy pawls or spring detents 65 mounted on upright studs 64 prevent rotation of the ratchet pinions 45 except in one direction. The yielding connection between the ratchet teeth 44 of the arm 41 with those formed on the ratchet pinion 45 permits the former to slide over the latter as the slide bar 31 moves backward, but its forward movement brings its teeth into operative connection with those of the ratchet pinion 45 to rotate the latter according to the extent of the retractive movement given to the slide bar by its coöperating actuating arm 10, and its corresponding forward return movement by its spring 38.

All of the rocking bars 51 which have been released and oscillated for carrying must be returned to their original position for subsequent similar action.

We will now proceed to describe the mechanism illustrated for attaining this result:—Mounted in the side members of the frame is a shaft 70 having as many pins 71 projecting therefrom as there are bars 51 (see Figs. 3, 7, 8 and 9). Each bar 51 has a cam portion 51ª, the edge of which is in the path of movement of a pin 71, so that when said shaft 70 is rocked, all of its pins 71 will engage the cam edges 51ª of those bars 51 which have been shifted out of normal position, and oscillate the bars and their cam portions to positions so that the notches 60 of the arms 55 will engage the fixed pins 59 hereinbefore described and lock all of the bars 51 in alinement in the positions shown in the lower portion of Fig. 3. The devices for actuating the shaft 70 are best shown in Fig. 13, in which the shaft 70 is shown as provided with an arm 72 normally held by means of a spring 73 secured to a post 74, against a stop pin 75. A rock shaft 76 which we term the "re-set shaft" is provided with an arm 77 which is normally held in the position shown in Fig. 13 by means of a spring 78. A trigger 79, pivoted at 80 to the arm 77, has its tip located above the outer end of the arm 72. This trigger is so pivotally mounted and arranged that upon downward movement of the arm 77, the trigger will depress the arm 72 and rock the shaft 70 and its pins, the trigger then snapping past the end of the arm 72, yielding on upward movement to pass the tip of said arm 72 to again assume the position shown in Fig. 13. As best shown in Figs. 3 and 4, the shaft 76 has fixedly mounted thereon, nine arms 81, the outer end of each being slotted and cut away to form a long lower finger 82 and a shorter upper finger 83. The lower finger 82 normally engages the under side of a pin 84 projecting from a finger key lever 17. These parts are so proportioned and positioned that the finger 82 receives the impact of the pin 84 and consequently whenever any finger key lever is actuated, the shaft 76 is rocked and consequently its pins will re-set any of the bars 51 that may have been displaced. The fingers 83 are short enough to pass down by the pins 84 of all of such finger key levers 17 as have not been actuated. Upon the actuation of any one finger key lever to a distance far enough to commence to oscillate the shaft 76, it immediately becomes impossible to actuate any other finger key lever, because at first the ends of the short fingers 83 take positions behind the pins 84 of levers 17 not depressed, so that any attempt, accidentally or otherwise, to depress another finger key lever, would result in a binding of the pin 84 of that lever against the tip of the short finger 83. Further movement of the actuated finger key lever toward its limit of downward movement carries all other short fingers 83 underneath the pins 84 of the other levers 17, so that if an attempt, accidental or otherwise, should then be made to depress another lever 17, the only result would be to positively complete the stroke of the lever 17 which it was intended to actuate, and nothing else would result from the partial depression of additional levers 17.

In order to render it certain that a lever 17 once started on its downward movement, must be carried to its limit of motion so as to properly complete the intended indication, the arm 77 is provided with a rearwardly extending ratchet segment 85 (see Fig. 13), said ratchet having a pin or projection 86 at the bottom of its line of teeth. A pawl 87, pivoted at 88 to the frame, is provided with a spring 89 which tends to normally hold the pawl in engagement with the teeth of the segment so that if the shaft 76 is actuated at all (as it is every time a key lever 17 is partially or wholly actuated), the pawl 87 will prevent a return of the shaft 76 and its arms and the actuated finger key lever to normal position. The pin 86 is so located that it will engage the tip of the pawl 87 when, and only when, the shaft 76 and said actuated finger key lever have been completely actuated. When the pin 86 engages the tip of the pawl, it oscillates the latter against the tension of spring 89, and disengages the pawl from the teeth of the segment so as to permit the spring 78 to act to return the shaft 76 and all of its arms to normal position. To hold the pawl 87 in its disengaged position long enough to permit all of the ratchet teeth to return to normal position, said pawl is provided with a shoulder 90 and a heel 91. Said shoulder 90 is adapted to be engaged by a catch 92, which is pivoted at 93, and to which catch one end of the spring 89 is connected. The moment the pin 86 throws the pawl out of engagement with the ratchet teeth, the catch holds the pawl until the ratchet segment returns to normal position. When said ratchet segment is thrown down due to the pull of spring 78, the lower edge of said ratchet segment contacts with the top of the catch 92 and disengages it from the shoulder 90 of the pawl so as to permit the spring 89 to again act and bring the pawl into position against the upper teeth of the ratchet segment which is the normal position for these parts.

It sometimes happens that a typewriter operator accidentally strikes two finger key levers at once, and of course the same thing may happen in connection with the levers 17. When this does happen, such two levers can only be slightly depressed, because the different parts which immediately begin to move, and which have been described, will so bind upon each other as to prevent the complete downward stroke of two levers 17. But if this happened, the ratchet segment 85 would of course move upward to a limited extent. To provide for this emergency, and to be able to release the pawl 87 in such a case, we provide a lever 94 pivoted at 95 and normally held in contact with a stop pin 96 by means of a spring 97. The lower end of the lever 94 extends forward to a position slightly above the heel 91 of the pawl 87. It will now be understood that whenever it may become necessary to release the pawl from the ratchet segment, a manual actuation of the lever 94 in the direction of the arrow above said lever in Fig. 13, will disengage the pawl from the ratchet segment and permit the shaft 76 and its arms to return to normal positions under the influence of spring 78.

We have mentioned how the mechanism just described must result in re-setting of previously actuated members whenever lever 17 is depressed. But this of course will leave the counters or indicators in various positions to show the total of the addition produced. We will now proceed to describe the mechanism whereby all of the counters or indicators may be re-set to zero, in order to prepare the machine for a new piece of work.

Referring to Figs. 3 and 14 to 17 a short shaft 100 is supported at one end by the frame of the machine, and at the other end by a post 101 rising from the base 5. The end of the shaft which is supported by the side frame of the machine passes through a sleeve hereinafter described. To one end of the shaft 100 is fixedly secured a lever 102 which we will herein refer to as the primary re-setting lever. Also fixed to said shaft 100 is an arm 103, the lower end of which is forked as shown in Fig. 17. A link 104 connects said arm 103 with an arm 105 of a rock shaft 106, said shaft 106 having twelve fixed arms 107 (see Fig. 2). The slides 31 are provided with lateral pins 108 which project across the path of oscillative movement of the arms 107, so that whenever the shaft 106 is rocked, all of the slides 31 must be retracted to their utmost limits, all moving backward in unison and to the same extent. A spring 109 (see Fig. 14) is connected to the link 104 and through said link serves to hold the shaft 106 and its arms in normal position, and also serving, through the arm 103 of the shaft 100, to hold the primary re-setting lever 102 in normal position. The pivotal connection between the link 104 and the arm 103 is provided by means of a pin 110 (Figs. 14 and 17). Said pin 110 also passes through the slot of a link 111, the other end of which is pivoted at 112 to an arm 113 of a shaft 114 (see Fig. 14). Said shaft 114 is mounted at one end in a side member of the frame (see Fig. 3) and at the other end in a post 114ª rising from the base 5. Said post 114ª also furnishes a bearing for the inner end of the re-set shaft 76 hereinbefore described. Secured to the shaft 114 is an arm 115 having two triggers 116 and 117 pivoted on opposite sides of its outer end (see Figs. 13, 14 and the lower part of Fig. 3). The function of trigger 117 will be first described, referring especially to Fig. 15. The tip of said trigger upon its downward movement acts upon the outer end of an arm 118 projecting rearwardly from a shaft 119, said shaft having an arm 119ª (see Fig. 13) which is engaged by a spring 119ᵇ to hold the said shaft 119 in normal position. Said shaft 119 is provided with eleven radial pins 120, all in one row, and in position to engage the locking levers 55 hereinbefore described, so as to hold said levers 55 and prevent their movement at periods hereinafter described.

Mounted loosely on the shaft 114 (see Fig. 15) is an arm 121 which has a pin and slot connection 122 with the arm 118 so that when said arm 118 is depressed by the trigger 117, it depresses the arm 121 and raises a ratchet segment 123 which is rigidly connected with or forms a part of the arm 121 and extends rearwardly. A pawl 124 pivoted to a stud 125 is normally held by a spring 126 in engagement with the teeth of the ratchet segment 123 so as to lock the shaft 119, through the pin and slot connections of arms 118 and 121, to prevent the return of the shaft 119 and its radial locking pins 120 until the pawl 124 is released. To effect this release, a pin 127 projecting from said pawl passes through a slot 129 of a link 128, said link being pivoted at 130 to an arm 131 of a sleeve 132 which surrounds the shaft 100 (see Figs. 15 and 17). Rigidly connected with the outer end of the sleeve 132 is the secondary re-setting lever 133, the outer end of said lever 133 having a finger piece which extends behind the primary lever 102 so that whenever the lever 133 is actuated in a forward and downward direction it must carry with it the primary lever 102. In Fig. 15 we show a comparatively light spring 134, said spring being connected to the arm 131 so as to normally hold the lever 133 against a stop pin 135 (see Fig. 16). The principal function of the spring 134 is to prevent any tendency of the lever 133 to move partially forward due to friction when the primary lever 102 is actuated. By referring to Fig. 15 it will be seen that movement of the lever 133 in the direction of the arrow, and to its limit, will cause the outer end of the slot 129 of link 128 to engage the pin 127 and disengage the pawl from the ratchet segment 123 and permit the parts to return to normal position.

The shaft 70 hereinbefore described is provided with an arm 140 (see Fig. 14), said arm projecting under the trigger 116 so that whenever the arm 115 moves downward, the trigger 116 depresses the arm 140 and then snaps past its tip to release said arm 140; that is so as to present no obstruction to the upward movement of the arm 140. But owing to the pivotal mounting of the trigger 116, the arm 115 carrying said trigger can move upward at any time regardless of the position of the arm 140. Said arm 140 has a pin and slot connection 141 with an arm 142 loosely mounted on the shaft 114, a ratchet segment 143 being fixed to or a part of the arm 142. Said ratchet segment is engaged by a pawl 144 which is pivotally mounted on the stud 125. A spring 145 is connected to the lower end of the pawl. When the parts are in the position shown in Fig. 14, the pawl 144 is held out of engagement with the teeth of segment 143 by means of a pin 146 projecting from link 111, so that when the parts are in this position the pawl is released from the ratchet segment. When all of the counters or indicators are to be re-set to zero, the operator first pulls forward the primary re-set lever 102, to the limit prescribed by a stop pin 147 (Fig. 16), and then releases said lever, so that the spring 109 will return the lever to normal position. Preferably the operator will retain hold of the lever to retard its return movement.

The first portion of the forward motion of lever 102 carries the slides 31 backward through arm 103, link 104, arm 105, shaft 106 and its arms 107. Further movement of lever 102 completes the rearward movement of the slides 31 and also depresses the arm 115 carrying triggers 116, 117. First the trigger 116 acts on arm 140 of shaft 70 so that the pins 71 of the latter act on cam portions 51ᵃ of bars 51 to set them in normal position. Then the trigger 117 acts on arm 118 of shaft 119 to place the pins 120 of the latter behind the arms 55 so that the tips of said arms 55 will be held in the path of movement of the radial projections 63 of pinions 45, to prevent movement of said pinions 45 beyond the points where their disks 46 will indicate the numerals 9 through the sight openings 48. On the return of lever 102, the slides 31 are moved forward by their springs 38 to actuate all pinions 45 to show numerals 9. The return motion of lever 102 also permits the triggers 116, 117, to assume their normal positions above the arms 140 and 118 respectively, but the arm 118 remains down because pawl 124 is still in engagement with the ratchet segment 123, and remains so engaged until released by the movement of parts caused by the actuation of the secondary lever 133 as presently described. Then the secondary lever 133 is actuated and the extreme of its forward movement acts through the slotted link 128 to release pawl 124 and permit arm 118 (see Fig. 15), shaft 119 and its pins 120 to return to normal positions. As the movement of lever 133 also brings the lever 102 forward a second time, the connections with the latter already described cause all slides 31 to move back equal distances to their limits, so that when the slides 31 return forward they will actuate all the counters to zero. At the end of the return movement of the levers, the pin 146 in link 111 engages the lower part of pawl 144 and carries said pawl to the position shown in Fig. 14 so as to release the carrying mechanism to normal position. When the ratchet segment 143 is released, the spring 73 (Fig. 13) acts on arm 72 to rock shaft 70 and its pins 71 to normal positions, this being permitted through arm 142 and arm 140 of shaft 70.

Upon the lateral position of the typewriter carriage depends the denominational value of the figure typewritten, and thus, upon the lateral position of the typewriter carriage must depend the connection for the actuation of the proper counter-operating bar and its connected counting indicator, to express values of corresponding denominations: i. e., if a figure be typewritten representing cents, the disk carried by the ratchet cylinder at the extreme right must be actuated sufficiently to indicate the increment of the numeral written, from one to nine in value. The number of columns required to express sums in figures varies with one's needs. Sums aggregating billions, with separating commas and period, would require sixteen of the positions provided by the traverse of the typewriter carriage, thus permitting five separate columns of figures to be written on a single sheet of paper, where, as in the present instance, there are eighty letter positions or steps in the traverse of the carriage. If, however, the sums required never reach ten thousand dollars, which with separating points would require eight of the eighty positions provided by the traverse of the typewriter carriage, ten such columns could be typewritten on a single sheet of paper, and their sums total indicated. In order that the carriage may effect such control, we have provided a selective mechanism, operated by the carriage, by which any of the number keys may be caused to connect with the appropriate counter actuator according to the position of the carriage, which is designed as follows:—Referring to Figs. 1, 2, 4 and 6, the shaft of the selecting mechanism is indicated at 150, said shaft having secured thereon as many disks 151 as there are slides 31. Each disk is provided with a lateral projection forming a cam 152 to act upon the rear end of a spring lever 35 to control the position of the pin 33 and determine whether or not the slide and counter of that particular group shall be actuated. One end of the shaft 150 projects outside of the inclosing frame of the machine and is provided with a spur pinion 153.

Projecting from the left hand side of the frame 6 (Figs. 2, 18 and 19) is a cylindrical stud 155. Mounted on the inner end of the stud is a disk having ratchet teeth 156 engaged by a pawl 157 pivoted at 158 to the side 6 of the frame; said pawl acting to restrain rotary motion of said disk. The disk is formed with a portion 159 of greater diameter which, for convenience, is referred to as a flange, and with a lateral annular flange 161 which is referred to as the hub flange and is sufficiently larger than the stud 155 to receive within it the hub 165 of a recessed disk 162 the periphery of which is flanged to receive upon it the steel tape 166. Within the recess of disk 162 is a volute spring 163 the outer end of which is secured to a pin 160 projecting from the inner face of the recess, the other end of said spring being secured by pin 164 to the hub flange 161. The winding of the spring by rotation of disk 156, 159 gives a rotary impetus to disk 162, and the rotation of said disk 162 is restrained by steel tape 166 fixed to and passing around its periphery, the perimeter measuring practically the same as the horizontal movement of the typewriter carriage, in its traverse of eighty step positions. The winding of the spring may be easily effected by means of a suitable tool inserted in any one of a number of holes 167 in disk 159.

The steel tape 166, which has a hook 169 at one end (Fig. 2), passes up and over a rimmed idler 170 rotarily mounted on pin 171, fixed angularly in upright post 172 (Fig. 1), said post being fixed to plate 5. The steel tape runs horizontally to the right, to be affixed by its hooked end 169 to a loop 173 (Fig. 2) of the typewriter carriage (not shown) provided for the tape connection between the typewriter carriage and the spring. Thus the rotary movement of the flanged disk 162, actuated by spring 163, is sufficient to perform its work, and also that of shifting the typewriter carriage, and it is also restrained by steel tape 166 so as to move step by step coincidentally with the carriage movement.

Rotarily and slidably mounted on an outwardly extending hub portion 165ª of disk 162 (Fig. 19) is a member composed of a hand wheel 174 bearing on its right a pinion wheel 154, and projecting to the right of the latter is a horizontal pin 175 designed to enter one of a series of small holes 176 in flanged disk 162, formed in the arc of a circle of equal radial distance to that of pin 175. This connection is to provide for the rotation of pinion wheel 154, for actuation of other parts step by step coincidentally with disk 162, and with the step motion of the typewriter carriage, and to provide for adjustment so that although the entire adding mechanism is retained in fixed lateral position, no part of it being attached to the carriage of the typewriting machine, yet a totalization may be made of columns of figures written on any part of the width of the sheet. This member, 154 and 174, is held laterally against disk 162 by a coiled spring 177 which surrounds sleeve 165ª between said member and a flange formed at its extreme left-hand end. The hand piece 174 affords means for sliding the pinion 154 attached thereto to the left, disengaging pin 175 and rotating it to a new angular position, the various holes being spaced to provide an adjustment such that the actuation of the mechanism for totalizing may be made to take place at any desired position of the typewriter carriage, as will be later described.

The shaft 150 carries a sixteen-toothed pinion 153 at its extreme left-hand end (thus agreeing with the step positions required to write a billion of dollars and cents with their necessary punctuation). The sixteen-toothed pinion 153 is in mesh with the eighty-toothed pinion 154 so that the step motion of the carriage permits transmission of rotation to shaft 150 by the power of spring 163, and said wheel is rotated oppositely by means of the steel tape, when the carriage is manually returned to its right-hand position.

The disks 151 are equal in number to the slides 31, and are fixedly mounted on said shaft 150, and spaced correspondingly to said slides so that their cam-rises 152 during rotary motion will be in line to contact with spring levers 35 (Figs. 2, 10 and 11), the ends of which levers are so formed as to permit the cam-rises 152 to pass in both rotary directions, thereby rocking said arms horizontally and, by pressing against the members 33, shifting the latter to the position where they may be engaged by actuating arms 10, thus selectively making connection between the rock shaft 9 and the slide bars 31 in order from left to right.

Shaft 150 in each revolution comes to sixteen positions of rest, being permitted to pass through twenty-two and one-half degrees of angular motion at each step of the carriage in this particular embodiment of the invention. If numbers are to be written consecutively in successive spaces, the disks 151 are so placed that their cam-rises will be at angles of twenty-two and a half degrees apart rotatively, but where a space is used to write separating commas or the period or decimal point between dollars and cents, the angular spacing is double that amount, or forty-five degrees, thereby affording a step space in which no actuation of any bar can occur. By changing the rotative position of disks 151 relatively to each other on shaft 150, the spacings may be changed or entirely omitted, the figures being written in columns of three, four, five or more, or in a solid block of twelve figures, if desired, and their correct values totalized. More or fewer of these cam disks may be used, according to the number of figures which it is desired to make the mechanism capable of totalizing, and with variation in the number of such disks, the number of teeth of the spur pinion 153 and large pinion 154 will be correspondingly changed. In the present invention the pinion 151, has eighty teeth, because the typewriter for use with which the apparatus is designed has that number of stopping places in its travel, and the pinion 153 has sixteen teeth, because the number of figures which may be written and added, with the spaces such as commas between groups of figures and the space for the decimal point, occupy sixteen spaces of the typewriter travel. For use in connection with other typewriting machines, these parts will be correspondingly modified.

The number of holes 176 in which the pin 175 may engage corresponds to the number of spaces which a complete line of figures to be written and totalized will occupy on the sheet, and the adjustment of the gear 154 relatively to the disk 162, determines the position on the sheet at which figures to be added may be written. During each revolution of the shaft 150, a complete series of slide bars 31 is put successively into condition for actuation by any one of the number keys, and several revolutions of the shaft may be made during the complete travel of the typewriter carriage. Accordingly, by placing the pin 175 in any selected one of the holes 176, columns of figures written in any selected part of the sheet may be added by the mechanism, and their sums indicated by the counter disks.

When the typewriter carriage is being returned manually, the shaft 150 having the disks 151 rotates rapidly. This might cause the cam-rises 152 to actuate the levers 35 so quickly as to throw the pins 33 out of their holes in slides 31, since the springs 34 are light. To prevent this, we provide each slide 31 with a hook 31ª, the tip of which overlaps the spring 34 but at a sufficient distance outside thereof to prevent the spring being pushed out far enough to enable a pin 33 to escape.

To prevent any rebound of the slides 31 we employ the following devices, referring particularly to Figs. 3, 4, 5 and 6. A detent bar 180 extends transversely of the machine above the slides 31 and behind pins 181 projecting upward from said slides. In order, however, to cause said bar 180 to move backward to permit a slide to be retracted, said bar is provided with rearwardly extending arms 182 pivotally connected at 183 to arms 184 secured to the shaft 9. Therefore, since the shaft 9 is oscillated whenever a finger key lever is depressed due to the engagement of a pin 33 by an arm 10 of said shaft, the detent bar will be shifted backward according to the amount of movement that is given to the shaft 9. This same bar 180 is utilized to prevent over-motion backward of the shaft 9 and its arms. To effect this, we provide each finger key lever 17 with a downwardly extending lug or stop 185. The stops 185 are not at uniform distances from the pivots of the levers 17, but are at varying distances therefrom so that the stop 185 of each lever 17 will, when such lever is depressed, reach the position so that its tip will be behind the bar 180 as shown in Fig. 6 at just the right point to limit rearward movement of said bar 180 but of course limits that movement at the right point to permit the shaft 9 to have the requisite amount of motion according to the particular lever 17 which is actuated.

When resetting to zero is effected, it becomes necessary to raise the bar 180 above the plane of the tops of the pins 181 to permit the slides 31 to be carried back to a uniform distance as has been described. To effect this lifting of the bar 180 we provide a lever 186 pivoted to the base at 187 and having a shoulder 188 and an incline 189 behind said pivot. A rod 190 is provided with a cam 191 at its front end and at its rear end is pivoted at 192 to an arm 193 of the shaft 106. It will now be understood that whenever the shaft 106 is oscillated in the manner hereinbefore described for resetting to zero, rearward movement of the rod 190 which is guided at 194 causes the cam 191 to act on the shoulder 188 of the lever 186, so as to depress the rear end of said lever and raise its front end which projects under the detent bar 180. This raising or lifting is quickly effected, while further movement of the shaft 106 in the same direction causes the tip of the cam 191 to ride along the incline 189 and hold the lifting lever 186 and the detent bar 180 in the raised positions indicated by dotted lines in Fig. 5. On the return movement of the shaft 106 and its arms, the cam 191, slips over the shoulder 188 and permits the parts to return to the positions shown by full lines in Fig. 5.

As the descriptions of the various details have been accompanied by reference to their operations and the timing thereof, further description of the operation of the machine as a whole will not be necessary.

It is to be understood that Figs. 1 to 19 inclusive represent one embodiment of our invention. In some respects, however, we prefer structures of details which will now be described and which are illustrated in Figs. 20 to 28 inclusive. While these may be referred to as modifications, so as to avoid illustrating a machine in its entirety including these changes, said changes constitute in reality improvements which we prefer. In this preferred embodiment of our invention, all of the parts which have the same reference characters, as in Figs. 1 to 19, will remain the same as in said figures, and therefore need not be again described in detail. One of the most important preferred embodiments which we will now describe, enables us to entirely dispense with the springs 38, one for each slide 31. We attain this result by making the detent bar 180 perform the service of returning each slide 31 forward to do the actuating of the counters. In the preferred embodiment illustrated in Figs. 20, 24, 25 and 26, the bar 180 has its arms 182 pivotally connected at 195 to studs 196 projecting downward from a slide plate 197. At each end, the slide plate 197 is provided or formed with a rib 198, adapted to slide back and forth on a guide or way 199. Said slide plate therefore can reciprocate in a horizontal plane and as it does so it, of course, carries with it the bar 180. Since said bar 180 is behind the pins 181 rising from the bars 31, when the slide plate 197 moves forward, it must return to forward position any bar 31 that has been reciprocated. We will now proceed to describe the means for operating the slide plate 197. At its ends the said plate is provided with upwardly projecting rack teeth 200, which are engaged by toothed segments 201 rigidly secured to the shaft 9. As the shaft 9 is provided with spiral springs 13 hereinbefore described, said springs 13 have a tendency to hold the plate 197 in its forward position. The slide plate 197 also takes the place of the arms 10 carried by the shaft 9. This is effected by providing the plate 197 with downwardly projecting pins 202 either one of which is adapted to engage a pin 33 of the selecting mechanism, in the same manner as has been described in connection with the arms 10 engaging said pins 33. This will be understood by comparing Figs. 20, 24 and 25. That is, whenever a finger key lever 17 actuates the shaft 9 so that the segments 201 are swung rearwardly, the slide plate 197 is retracted and one of its pins 202 will engage the particular pin 33 which has been projected by the selecting mechanism into operative position, to be engaged by a pin 202 so that the rearward movement of the plate 197 will retract the selected slide bar 31. The return movement of such slide bar is effected by the engagement of the transverse bar 180 with the pin 181 rising from the selected slide bar. In this embodiment of the invention, the arms 107 of the shaft 106, instead of engaging pins projecting from the slide bars 31, are reduced in width or tapered at their lower ends as shown at 203, said tapered ends projecting into narrow slots 204 (Fig. 20) formed in the slides 31.

To avoid any possibility of the counter disks 46 not occupying exactly the proper positions for showing their numerals through the sight openings when the projections 63 are stopped, each ratchet pinion 45 may be provided with an upper lateral projection 631 (Figs. 21, 22) adapted to engage the tip of an arm 205 pivotally connected at 206 to a bar 207 which is suitably supported at its ends by the frame of the machine, said bar 207 extending above the pins 53. Said bar is provided with stop pins 208 against which the arms 205 are pressed by springs 209. The springs 209 hold the arms 205 normally against the stop pins 208 which are so located that the tips of the arms 205 will be engaged by the lateral projections 631 when the ratchet pinions are in position to exhibit the digits 9 through the sight openings. But when carrying is effected, the arms 205 will yield (the springs 209 being very light ones) and enable the projections 631 to pass by the tips of the arms 205.

Referring to Fig. 23, the pivoted rack arms 41 may have their rear edges recessed as at 410 to receive offset portions 430 of the springs 43. The ends of the springs 43 are attached to fixed studs rising from the base and therefore do not reciprocate with the arms 41. With the structure shown in said Fig. 23, when a slide 31 is retracted and then advanced again for the actuation of a rack pinion, the recess 410 is of course shifted so that the offset portion 430 of the spring rides along the straight rear edge of the arm 41 and therefore holds said arm against the ratchet pinion with the full force of the spring 43. The recess 410 is so located as to receive the offset 430 of the spring when the arm 41 has finished its actuation of a ratchet pinion and therefore the pressure of the spring is considerably lightened or may be entirely taken off, due to the recess 410. This provides for less resistance to movement of the ratchet pinions when they are being turned around for carrying. It also aids in holding the arms 41 and the slides 31 in accurate positions longitudinally of the machine.

When the slides 31 are being actuated to reset the counters or indicators to zero, there must be brought into action means other than the bar 180 for projecting said slides forward, because the said bar 180 must necessarily be lifted from behind the pins 181 in order that said slides 31 may all be carried backward uniformly.

We will now proceed to describe the mechanism illustrated in Figs. 20, 24, 27 and 28, which comes into play when resetting to zero:—The slides 31 are considerably shorter than in the embodiment first illustrated and described, the rear end of each slide having an upward projection or lug 212 which is engaged by a transverse bar 213 to limit forward movement of said slides 31. Behind each bar 31 is a slide 214, the front end of which is preferably laterally beveled or inclined as shown in Fig. 20. The rear end of each slide 214 passes between two guide pins 215 rising from the base of the machine or from a strip or bar carried thereby, said slide 214 being provided with a lateral shoulder or lug 216 which engages one of the pins 215 to limit forward movement of the slide. These pins 215 provide for a sliding and also pivotal movement of the members 214, each said member or slide 214 being normally held with its lug 216 in contact with a pin 215 by means of a spring 217 connected to it and to a fixed point which may be provided by means of a hook carried by a fixed cross bar 218. The slides 214 pass between pins 219 rising from a transverse slide 220 having a beveled end 221 and normally held in the position shown in Fig. 20 by means of a spring 222 attached to said slide 220 at 223 and to the base or other fixed point at 224. The slides 214 normally occupy the positions indicated in Fig. 20. But when resetting to zero is to occur, the said slides 214 are shifted into alinement with the slides 31, by movement imparted to the transverse slide 220. This movement is effected by means of a wedge slide 225 having an inclined face to coact with the beveled end of the transverse slide 220 to shift said slide 220 the necessary distance to carry the front ends of the slides 214 behind the rear ends of the slides 31, said wedge slide having the straight side parallel with its path of movement so that said wedge slide can continue to move to the rear without shifting the slide 220 beyond the point necessary to bring the slides 214 into alinement with slides 31.

At this point it should be borne in mind that the primary resetting lever is actuated twice to effect a final resetting of the counters or indicators to zero. It therefore becomes essential that the wedge slide 225 shall be carried backward upon the first actuation of the primary resetting lever and shall remain there until the end of the return half of the movement of the front secondary resetting lever. The slide 225 therefore is carried backward by means of a push-arm 226, the tip of which engages the front of the slide 225 and its front end being pivoted to the arm 105 of shaft 106. Therefore when the shaft 106 is first actuated in the manner hereinbefore described, the push-arm 226 will force the wedge slide 225 rearward and will then leave it there when the arm 105 and arm 226 re-assume the position shown in Fig. 28. To bring the slide 225 back again to the position shown in Fig. 20 at the end of the return half of the actuation of the secondary resetting lever, we provide said slide 225 with a shoulder or lug 227 on its upper face, the rear side of which is adapted to be engaged by the tip of a finger 228 pivoted at 229, to the side wall of the frame and having a pin 230 at an intermediate point. The arm 231 is pivotally mounted at one end on the pivot pins 130 carried by the arm 131, of the sleeve 132 which, as has been described, is oscillated whenever the secondary lever 133 is actuated. Said arm 231 extends rearwardly over the pin 230 of the finger 228 and is formed with a shoulder 232 and behind said shoulder with a straight edge 233. When the wedge slide 225 is pushed backward, its lug 227 swings the finger 228 backward under the straight edge 233 of the arm 231, and the said arm 231 is held in substantially the position shown in Fig. 28 by means of a fixed pin 234, engaging the upper edge of a portion of said arm 231 which is in front of its pivot 130. When the wedge slide is first pushed rearwardly, the arm 231 does not move because the resetting lever which would actuate it is not moved. But when the secondary resetting lever is drawn forward, it causes a rearward movement of the arm 231 so that the shoulder 232 engages the pin 230 of the finger 228. Then when the secondary resetting lever returns to normal position, the arm 231 swings the finger 228 forward and so brings the wedge slide back to the position shown in Figs. 20 and 28, thus, at the same time permitting the spring 222 to act to shift the transverse slide 220 and swing all of the supplemental slides 214 out of alinement with the slides 31, thus leaving all of the slides 31 free again to be actuated for counting without said slides being opposed by any spring devices other than the spring or springs which tend to move the slide plate 197 and the bar 180 forward.

As shown in Fig. 27, the means for raising the detent bar 180 comprises a lever 235 pivoted to a stud 236 rising from base 5, the tip of said lever extending under bar 180. As shown, this lever is made of a flat piece of metal twisted at 237 and bent upward and rearward, its extreme rear end 238 extending over an arm 239 projecting from shaft 106. A spring 240 connected to the rear portion of the lever and to a fixed part of the machine, normally holds the lever in the position shown in said Fig. 27. But upon the first actuation of the primary re-setting lever, the shaft 106 turns as hereinbefore described, and the arm 239 swings downward and permits the spring 240 to actuate the lever 235 and thus raise the detent bar. To prevent the detent bar 180 from being thrown too high or from being carried back at inopportune times such as when resetting to zero, we provide a post 241 fixed to the base and having a horizontal arm 242 provided with a depending lug or catch 243 at its end, said arm and lug being high enough to permit the detent bar to move under it when not raised for re-setting. This retaining device for the detent bar is also shown in Figs. 4, 5 and 6.

To hold the detent bar 180 up and prevent it from dropping during the interval between the two actuations of the primary re-setting lever, we mount a flat-topped block 244 and connect it by a slender rod 224$^a$ with the wedge slide 225 (see Fig. 20). The connection is such that the block 244 follows all movements of the slide 225, said block 244 occupying a position under the detent bar 180 when the slide 225 is pushed backward.

It will be readily understood that the calculating mechanism herein explained and claimed may be made up as a separate machine of any dimensions or capacity for use alone as a table machine.

A calculating mechanism constructed according to the drawings herein demonstrates that its use under a typewriter from which the usual rubber feet have been taken, raises such typewriter only about three-quarters of an inch above its customary elevation. If rubber feet or pads are desired for this machine they may be recessed in the base 5.

The mechanism herein described is capable of being utilized in connection with a constantly-rotating power-driven shaft such as that in the application of Palmer and Berry, filed November 14, 1908, Serial No. 462,584, in which either one of a series of eccentrics 48 is controllably connected to a shaft 41 for a single rotation, said shaft 41 being driven by an electric motor. The eccentrics shown in said application reciprocate certain eccentric rods 74 which, in turn, cause a bar 81 to swing more or less according to the amount of eccentricity of the particular eccentric which is brought into action by a particular finger key lever. Such swinging bar would then be mounted in arms of the shaft 9 or 9ᵃ of the mechanism illustrated herein.

We claim:

1. In a calculating mechanism having indicators and ratchet pinions associated therewith, reciprocating racks for operating said pinions, said racks being movable toward and from the pinions, and movable abutments to coöperate with said racks to prevent their separation from the pinions at the end of their operative movement.

2. In a calculating mechanism having indicators and ratchet pinions associated therewith, reciprocating racks for operating said pinions, said racks being movable toward and from the pinions, pivotally mounted arms, and abutments carried by said arms to coöperate with said racks to prevent their separation from the pinions at the end of their operative movement.

3. In a calculating mechanism having indicators and ratchet pinions associated therewith, reciprocating racks for operating said pinions in one direction only, pivotally mounted arms, abutments carried by said arms to coöperate with the racks to prevent their separation from the pinions at the end of their operative movement, and a ratchet tooth connected with each of said arms to actuate the pinion at the left for carrying.

4. In a calculating mechanism having indicators and ratchet pinions associated therewith, reciprocating racks for operating said pinions, pivotally mounted arms, abutments carried by said arms to coöperate with the racks to prevent their separation from the pinions at the end of their operative movement, a ratchet tooth connected with each of said arms to actuate the pinion at the left for carrying, said ratchet tooth having a cam-faced rear edge, and a fixed abutment to coöperate with said cam-faced edge to hold the ratchet tooth in engagement with said pinion at the left to prevent over-motion thereof when carrying.

5. In a calculating mechanism, a plurality of counting indicators, parallel slides for actuating said indicators, and a single movable member formed to act as a combined detent and actuator for each of said slides.

6. In a calculating mechanism, a plurality of counting indicators, slides for actuating said indicators, said slides having pins, and a combined detent and actuator crossing the slides behind their pins and serving to prevent over-motion of said slides in one direction and to move them in the other direction.

7. A calculating mechanism comprising in its construction a series of counters or indicators, slides for actuating them, a plate extending across all of said slides, key-controlled means for reciprocating the plate, a greater or lesser distance according to which key is operated, and a selective device for connecting one of the slides with said plate.

8. A calculating mechanism comprising in its construction a series of counters or indicators, slides for actuating them, a transverse bar for actuating the slides in one direction, a plate extending across all of said slides, key-controlled means for reciprocating the plate a greater or lesser distance according to which key is operated, and a selective device for connecting any one of the slides with said plate to actuate such slide in the other direction.

9. A calculating mechanism comprising in its construction a series of counters or indicators, slides for actuating them, a transverse bar for actuating the slides in one direction, a plate extending across all of said slides, key-controlled means for reciprocating the plate a greater or lesser distance according to which key is operated, a selective device for connecting any one of the slides with said plate to actuate such slide in the other direction, and manually operable devices having connections whereby said plate will actuate a slide to an amount according to the particular manual device operated.

10. A calculating mechanism comprising in its construction a series of counters or indicators, slides for actuating them, said slides having pins, a transverse bar crossing the slides behind their pins, a plate extending across all of said slides, connections between said plate and bar whereby they reciprocate in unison, key-controlled means for reciprocating the plate a greater or lesser distance according to which key is operated, and a selective device for connecting any one of the slides with said plate.

11. A calculating mechanism comprising in its construction a series of counters or indicators, slides for actuating them, said slides having pins, a transverse bar crossing the slides behind their pins, a transverse plate, connections between said plate and bar whereby they reciprocate in unison, means for reciprocating the plate, and a selective device for connecting any one of the slides with said plate, means being provided whereby said transverse bar may be raised at times above the tops of the pins of the slides.

12. A calculating mechanism comprising in its construction a series of counters or indicators, slides for actuating them, a rock-shaft having toothed segments, a transverse plate having racks engaged by said segments, means under the control of the operator for varying the amount of movement of said rockshaft, and a selective device for connecting any one of the slides with said plate.

13. A calculating mechanism comprising in its construction a series of counters or indicators, slides for actuating them, manually operable devices for shifting the slides in one direction, selectively controlled mechanism for shifting the slides in the other direction, a supplemental series of slides normally disconnected from the counter-actuating slides and having springs for moving them in one direction, and a resetting mechanism having connections whereby the supplemental slides may be brought into engagement with the counter-indicating slides when the counters are to be reset to zero.

14. A calculating mechanism comprising in its construction a series of counters or indicators, slides for actuating them, manually-operable devices for shifting the slides in one direction, selectively controlled mechanism for shifting the slides in the other direction, a supplemental series of slides normally disconnected from the counter-actuating slides and having springs for moving them in one direction, a resetting mechanism having connections whereby the supplemental slides may be brought into engagement with the counter-indicating slides when the counters are to be reset to zero, said resetting mechanism including a reciprocable slide, and a transverse slide adapted to be actuated thereby, said transverse slide having connections with the supplemental resetting slides to control their positions with relation to the counter-actuating slides.

15. A calculating mechanism comprising manually-operated members, a plurality of counting indicators, actuators for said indicators, an equal number of arms operated simultaneously by any one of said members and normally out of engagement with the corresponding indicator-actuators, and mechanism for individually making connection of selected arms with the corresponding actuators, whereby the value represented by any manually-operated member may be added to the quantity indicated by any of said indicators.

16. A calculating mechanism comprising a plurality of counting indicators, an actuator for each of said indicators, a rock-shaft having arms and independently selectable connections whereby motion may be transmitted independently to said actuators, there being one of such arms and connections for each actuator, and number keys representing the nine digits arranged to move said rock-shaft through distances respectively corresponding to the values of the several digits.

17. A calculating apparatus comprising a series of members representing the nine digits, a rockshaft, connections between said members and shaft constructed to impart degrees of rotation from the members to the shaft severally proportional to the values of the numbers represented by said members, a plurality of counting indicators, arms equal in number to said indicators carried by said shaft, and connections by which each of said arms may cause motion of the indicator corresponding thereto.

18. A calculating mechanism comprising a plurality of indicators, an equal number of swinging arms so mounted and connected as to swing in unison, a series of manually-operated members representing the nine digits operable to swing said arms in unison through varying degrees proportional to the numerical values represented by the several numbers, and means for making independent separable actuating connection between each of said arms and the corresponding indicator.

19. A calculating mechanism comprising a plurality of number-key levers representing the several digits, a rockshaft, arms rigidly fixed upon said rockshaft so as to partake of the angular motions thereof, connections between said levers and rockshaft variously arranged to cause actuation of the levers to oscillate the shaft through varying amounts proportional to the numerical values of said levers, a plurality of counting indicators, reciprocable bars arranged to operate said indicators, and means for making connection between each of said bars and one of the said arms, whereby swinging of the latter may move the bar.

20. A calculating apparatus comprising number indicators, a reciprocable actuating bar for each of said indicators having a one-way driving connection with its respective indicator, manually-operated number keys representing the several digits, a plurality of swinging arms equal in number to said actuating bars, one of such arms located adjacent each bar and normally out of connection therewith, means for converting an equal propelling motion of all of said keys into varying simultaneous oscillation of said arms, according to the numerical value represented by the key, selective mechanism for consecutively permitting engagement between the several arms and their adjacent actuating bars so that the latter may be moved in the non-driving direction, and yielding propelling means for returning said bars and advancing the corresponding indicators.

21. The combination of a typewriting machine, key levers forming part of such machine, a calculating apparatus located beneath said typewriting machine, pivotally mounted key levers forming part of said apparatus and extending forwardly of the typewriting machine, rearwardly extending levers engaged with each of the key levers of said apparatus so as to be depressed at their rear ends when the said key levers are depressed, connections between the several last-named levers and the corresponding key levers of the typewriting machine operative to depress the latter, and complemental counter-operating levers pivoted in the apparatus upon a separate fulcrum from the said rearwardly extending levers and engaged with the latter at varying distances from the fulcrums thereof so as to be oscillated thereby through distances proportional to the numerical values of the several number keys.

22. The combination with a typewriting machine and the key levers thereof, of a calculating apparatus located beneath said typewriting machine and having key levers adapted to be manually depressed extending forwardly of the typewriter key levers, rearwardly extending levers pivoted in said apparatus near the forward ends of the key levers thereof, and each engaged with one of said key levers so as to be depressed at its rear end upon depression of the latter, connections between the several rearwardly extending levers near the rear ends of the latter and the corresponding key levers of the typewriter, whereby depression of the calculating apparatus key levers will effect an approximately equal depression of the typewriter key levers, and counting mechanism operated through varying distances from said rearwardly-extending levers to indicate numerical values.

23. The combination of a calculating apparatus and a typewriting machine associated with and located above said apparatus, each having a set of manually-operable keys, counting indicators forming part of said calculating apparatus, arms pivotally mounted in said apparatus operated uniformly by the several key levers of the apparatus, connections between said arms and the typewriter key levers for operating the latter uniformly, and connections from the same arms actuated through varying distances proportional to the numerical values of the key levers and connectible with the counting indicators for operating the same.

24. In a calculating apparatus, the combination of a plurality of counting indicators, a longitudinally movable actuating bar having teeth, a ratchet carried by each indicator with which said teeth engage when the bar is moved in one direction, the shape of such teeth permitting non-actuating movement of the bar past the same in the opposite direction, a rocker bar pivotally mounted in an intermediate position between adjacent counters, an abutment on said rocker in position to prevent the end of said actuator from becoming disassociated with the ratchet teeth and therefore prevent over-movement of the indicator, a pawl carried by said rocker arranged to mesh with the ratchet teeth of the adjacent left-hand indicator, a spring tending to rock said bar and thereby move said pawl in the direction necessary to advance such indicator, a detent adjacent the next right-hand indicator preventing action of said spring, and a pin or tooth moved rotarily by the right-hand indicator arranged to displace said detent and permit movement of the pawl for advancing the left-hand indicator to carry tens.

25. In a calculating apparatus, the combination of a plurality of counting indicators, each having a ratchet, a toothed actuator bar longitudinally movable meshing with the teeth of said ratchet for advancing said indicator, said teeth being shaped so as to permit slipping thereof in one direction, a pawl carrier having an abutment in position to prevent the end of the actuator from becoming dis-associated with the teeth of the ratchet to prevent over-motion of the indicator, a pawl mounted on said carrier in engagement with the adjacent ratchet, means normally exerting power on said carrier in the direction necessary for moving the latter and the pawl to advance the ratchet, a detent preventing such movement, and means operated by the indicator next at the right when moving to take the zero-indicating position for disabling said detent and permitting such movement of the pawl carrier, such movement at the same time releasing the abutment from the actuator bar at the left and permitting further movement of the associated indicator ratchet by said pawl.

26. In a calculating apparatus, rotary counting indicators each having a ratchet, a longitudinally movable actuator bar for each said indicator, a pivotally mounted arm carried by said bar having complemental ratchet teeth engaged with the teeth of the ratchet, and movable toward and from the same, springs for yieldingly holding the ratchet-toothed arms in contact with the pinions, and detents for preventing backward movement of the pinions.

27. In a calculating apparatus, a rotary counting indicator, a longitudinally reciprocable actuator bar therefor, a ratchet connected with said indicator, an arm pivotally mounted on said bar carrying inclined rack teeth engaged with the teeth of said ratchet, the pivot of said arm permitting the latter to swing toward and from the ratchet, and a spring holding said arm against the ratchet.

28. In a calculating apparatus, a plurality of counting indicators mounted in fixed lateral position relatively to the frame of the apparatus, a series of manually-operated number-key levers, mechanism controlled by any of said levers for operating each of said indicators, independent carrying devices for carrying tens from each indicator to that at the left thereof, and means operated by each key for returning any carrying device to normal position prior to subsequent operation of any indicator.

29. In a calculating apparatus, a series of manually-operated number keys, a plurality of counting indicators, actuators for said indicators, connections by which said keys when depressed retract said actuators, yielding means for advancing the actuators to advance the counting indicators, tens-carrying devices normally tending to advance the indicators with which they are engaged, and also normally held locked against operation, means by which any indicator when moving to reach the zero-indicating position may release the adjacent tens-carrying device and permit advancement thereby of the next left-hand indicator, and means for resetting all of said devices in operative position, controlled by the depression of any number key prior to subsequent actuation of any indicator.

30. In a calculating apparatus, a series of pivotally mounted number key levers, a plurality of counting indicators mounted in fixed lateral position relatively to the frame of the apparatus, tens-carrying devices for said indicators consisting of displaceable pawls, means for displacing the same, a pawl replacer, and connections through which any key when depressed will actuate said replacer to return any displaced carrying pawl to normal position.

31. In a calculating apparatus, a plurality of counting indicators mounted in fixed lateral position relatively to the frame of the apparatus, tens-carrying devices for said indicators automatically displaceable to advance the indicators with which they are respectively associated, a replacing device for said carrying devices, and means for actuating said replacing device by depression of any of said key levers.

32. In a calculating apparatus, a plurality of counting indicators, displaceable carrying devices for said indicators, a replacer for said devices consisting of a rock-shaft and arms thereon adjacent each said carrying device arranged to replace the latter upon rocking of said shaft, a second shaft having a connection with said rock shaft for communicating motion thereto, and a series of operating number keys each having an independent connection with said second shaft whereby to rock the same upon depression of any key.

33. A calculating apparatus comprising a series of oscillating arms, manually-operated number keys connected to oscillate said arms, reciprocating bars each adjacent to one of said arms but at one side of the path of oscillation thereof, an abutment carried by each of said bars, and means for displacing said abutment into the path of the adjacent arm, whereby the latter is caused to move the adjacent bar.

34. In a calculating apparatus, a series of number keys, a plurality of swinging arms connected for operation in unison by any one of said keys, a longitudinally reciprocating counter actuating bar beside each of said arms, but out of connection therewith, an abutment carried by each of said bars, and means for shifting the abutments of the several bars successively into the paths of the several arms.

35. In a calculating apparatus, a plurality of longitudinally movable counter-actuating bars, an equal number of arms mounted to move beside said bars respectively, a shiftable abutment carried by each bar, and selective means for successively shifting the abutments of the several bars into the paths of said arms.

36. In a calculating apparatus, a series of longitudinally movable counter-actuating bars, a series of arms, each such arm being adjacent to and beside one of said bars, a laterally-shifting abutment carried by each said bar directly in rear of the corresponding arm, a spring carried by each bar bearing on said abutment and holding the same out of the path of said arm, and a lever adjacent each bar operative to engage and shift the abutment thereof into the path of the adjacent arm, the said spring being then displaced to the opposite side of the arm so that the latter may enter between it and the bar.

37. In a calculating apparatus, a series of number keys, a series of longitudinally movable counter-actuating bars, movable arms operated by said keys, each arm being also at one side of the corresponding bar, an abutment carried by each bar and movable therein across the path of movement of the adjacent arm, a leaf spring carried by each bar bearing against said abutment and normally lying flat against the side of the bar out of engagement with the arm and clear of the end thereof so as to be movable past the same, and a spring lever on the opposite side of each bar from said spring engaging the opposite end of said abutment and operable to move the latter into the path of motion of said arm so that the arm may engage the abutment and retract the bar, at the same time moving said spring across the end of the arm so that the latter may enter between it and the bar to prevent displacement of the abutment out of contact with the bar until return of the latter to its normal position.

38. A calculating mechanism comprising a plurality of counting indicators, individual actuating members for said indicators, yielding means tending to move said members in the actuating direction, manually operated keys connectible individually with said members for moving them graduated distances in opposition to said yielding means into actuating positions, and means for resetting all said indicators in their zero positions, including means for retracting said actuator members simultaneously and uniformly, and stops for arresting the indicators in the desired positions.

39. A calculating mechanism comprising a plurality of counting indicators, individual actuating members for said indicators, yielding means tending to move said members in the actuating direction, manually operated keys connectible individually with said members for moving them graduated distances in opposition to said yielding means into actuating positions, an independently operated indicator-setting device operable to place all of said actuator members in position to advance all the indicators sufficiently to present the same indication, and stops for arresting the indicators upon their arrival in such position.

40. In a calculating apparatus, a plurality of counting indicators, individual actuators therefor independently operable in the usual procedure for calculating, a resetter, means for making connection between said resetter and said actuators, whereby to shift the indicators into their zero-indicating positions, displaceable stops for arresting the several indicators upon arrival thereof in positions in which all show identical indicators, and a controller for said connection-making means and said stops.

41. In a calculating apparatus, a plurality of counting indicators, individual actuators therefor independently operable in the usual procedure for calculating, a resetter, tens-carrying members intermediate adjacent indicators, locks preventing operation of said members, trips carried by said indicators arranged to release said locks, a resetter for moving the indicators simultaneously into uniform position, and detents by which said locks are prevented from release and are converted into stops which arrest the indicators upon arrival thereof into such position.

42. In a calculating apparatus, a plurality of counting indicators, individual actuators therefor independently operable in the usual procedure for calculating, a resetter, tens-carrying members intermediate adjacent indicators, locks preventing operation of said members, trips carried by said indicators arranged to release said locks, a resetter for moving the indicators simultaneously into uniform position, detents by which said locks are prevented from release and are converted into stops which arrest the indicators upon arrival thereof into such position, and a controller by which said detents are made operative and inoperative, and by which, also, said resetter is put into connection with said actuators.

43. In a calculating apparatus having a plurality of indicators, individual actuators for the several said indicators, a series of manually-operated number keys, connections operated by said keys for operating said actuators, but normally disconnected therefrom, automatic selective mechanism for making connection successively between corresponding actuating members and key-operated connections, and a controller by which simultaneous connection is made between all of said connections and actuators for permitting the indicators to be simultaneously placed in their zero-indicating positions.

44. In a calculating apparatus having a plurality of indicators, individual actuators for the several said indicators, a series of manually-operated number keys, connections operated by said keys for operating said actuators, but normally disconnected therefrom, automatic selective mechanism for making connection successively between corresponding actuating members and key-operated connections, a controller by which simultaneous connection is made between all of said connections and actuators for permitting the indicators to be simultaneously placed in their zero-indicating positions, and stops made operative by said controller for arresting the several indicators when the latter have been moved into position for showing uniform indications.

45. In a calculating apparatus, a plurality of indicators, individual actuators for the several indicators, a series of number keys, intermediate members operated by said number keys adjacent to the several actuators, but normally out of connection therewith, selective mechanism for making individual connection between the several said members and the actuators adjacent thereto, independent carrying mechanism normally locked against actuation, but arranged to be tripped by the indicators for carrying tens to the next adjacent indicators to the left, a controller, and means operated thereby when in one position to make connection simultaneously between all of said actuators and their corresponding key-operated members, and to lock said carrying mechanism, whereby the latter become stops to arrest the indicators immediately before arrival thereof into their zero-indicating positions, said means being operative in another position of the controller to release said carrying mechanisms while maintaining connection between the several actuators and key-operated members.

46. In a calculating apparatus, a plurality of indicators, longitudinally-movable actuator bars for the several indicators, an equal number of swinging arms connected to swing simultaneously and arranged adjacent the respective actuator bars, a series of keys connected to swing said arms through respectively varying distances, means for severally making connection between adjacent arms and bars, whereby the latter may be moved by the keys to advance the indicators, a connector for making simultaneous connection between all of the arms and adjacent bars, and a lever for swinging said arms in unison to set the indicators in their zero-presenting positions.

47. In a calculating apparatus, a plurality of indicators, longitudinally-movable actuator bars for the several indicators, a rock-shaft, arms keyed thereon adjacent to the several bars, but normally out of connection therewith, manually-operated keys for rocking said bars through distances varying respectively according to the values of the several keys, mechanism by which connection may be made independently between the several bars and adjacent actuators, whereby any of the keys may be caused to actuate any of the indicators, a controller for making simultaneous connection between the several arms and adjacent actuators, and a lever for rocking the arms and simultaneously moving all the actuators, whereby the indicators may be placed in zero-indicating position.

48. In a calculating apparatus, a plurality of indicators, longitudinally-movable actuator bars for the several indicators, a rock-shaft, arms keyed thereon adjacent to the several bars, but normally out of connection therewith, manually-operated keys for rocking said bars through distances varying respectively according to the values of the several keys, mechanism by which connection may be made independently between the several bars and adjacent actuators, whereby any of the keys may be caused to actuate any of the indicators, a controller for making simultaneous connection between the several arms and adjacent actuators, a lever for rocking the arms and simultaneously moving all the actuators, whereby the indicators may be placed in zero-indicating position, and displaceable abutments or detents for arresting the indicators when they have thus been moved into uniform position.

49. In a calculating apparatus having counting indicators, actuators therefor, and key-operated means for moving said actuators, independent manual means for setting the indicators in zero position including a member for causing the actuators to advance the indicators, displaceable detents for arresting the indicators upon arrival thereof into uniform position, and a controller by which said detents may be made operative and inoperative.

50. In a calculating apparatus having counter actuators, manually-operated members for operating said actuators normally disconnected therefrom; a rotary selector for making successive connection between the several actuators and their operating members, a driver for said selector, a spring actuator for said driver controlled so as to move intermittently, and means whereby the driver, and consequently the selector, may be connected in various positions with respect to said actuator.

51. In a calculating apparatus of the character described having counter actuators, normally disconnected manually-operated members for operating said actuators, and a rotary selector for making connection successively between the several actuators and the corresponding operating members, a gear engaged with said selector for driving the same, a spring-driven drum mounted to rotate beside said gear, the latter being rotatable relatively to the drum, and provisions for making engagement between the gear and drum at any one of a plurality of points.

52. In a calculating apparatus, the combination of two or more counting indicators mounted in fixed lateral position relatively to the frame of the apparatus, an actuator for each indicator, carrying mechanism for advancing the indicator at the left, including a ratchet connected with said indicator and a pawl coöperating with said ratchet, means controlled by the motion of the indicator at the right for actuating said mechanism at the proper time, and means for holding said pawl to prevent separation from the ratchet at the conclusion of the carrying movement and thereby preventing over-motion of the indicator.

53. The combination of a plurality of rotary counting indicators mounted in fixed lateral position relatively to the frame of the apparatus, a ratchet engaged with each of said indicators, a bodily movable pawl engaged with said ratchet, means tending to move said pawl in the direction necessary to rotate the ratchet and indicator, means controlled by the next indicator to the right for permitting actuation of said pawl, and an abutment located on the opposite side of said pawl from the ratchet constructed and arranged to prevent movement of the pawl away from the ratchet.

54. The combination of a plurality of rotary counting indicators, mounted in fixed lateral position relatively to the frame of the apparatus, a ratchet engaged with each of said indicators, a bodily movable pawl engaged with said ratchet, means tending to move said pawl in the direction necessary to rotate the ratchet and indicator, means controlled by the next indicator to the right for permitting actuation of said pawl, said pawl having an inclined cam portion on the side thereof opposite to the ratchet, and an abutment located so as to be engaged by said cam portion during the movement of the pawl so as to prevent movement of the pawl away from the ratchet.

55. In a calculating mechanism, a series of finger key members, indicators actuated thereby, a shaft having arms extending into proximity to the finger key members, said finger key members having means to coöperate with said arms for holding the former from being shifted, and means whereby operation of one finger key member shifts the arms to prevent operation of another finger key member.

56. In a calculating mechanism, a series of finger key members, indicators actuated thereby, a shaft having forked arms extending into proximity to the finger key members, and pins projecting from said finger key members into the forks of said arms.

57. In a calculating mechanism, a series of finger key levers having lateral pins, indicators actuated by said levers, and a shaft below said levers and having forked arms engaging the pins of the levers, the forks of said arms presenting lower fingers longer than the upper fingers, the longer fingers extending under the pins of said levers.

58. In a calculating mechanism, a series of finger key members, indicators actuated thereby, a shaft having means whereby operation of one finger key member will prevent operation of another finger key member, and means whereby said shaft must be given its complete actuation before it can be released for a second operation.

59. In a calculating mechanism, a series of finger key members, indicators actuated thereby, a shaft having means whereby operation of one finger key member will prevent operation of another finger key member, and means whereby said shaft must be given its complete actuation before it can be released for a second operation, said means comprising a ratchet segment secured to said shaft, a pawl engaging said ratchet, and means for automatically disengaging said pawl from the ratchet segment at the end of the movement of said segment.

60. In a calculating mechanism, a series of finger key members, indicators actuated thereby, a shaft having means whereby operation of one finger key member will prevent operation of another finger key member, and means whereby said shaft must be given its complete actuation before it can be released for a second operation, said means comprising a ratchet segment secured to the shaft and having a pin or projection at the end of the series of teeth thereof, a pawl engaging said ratchet segment, and a catch for said pawl, the said pawl being adapted to be engaged by said catch when the pin engages the pawl.

61. In a calculating mechanism, a series of finger key members, indicators actuated thereby, a shaft having means whereby operation of one finger key member will prevent operation of another finger key member, and means whereby said shaft must be given its complete actuation before it can be released for a second operation, said means comprising a ratchet segment secured to said shaft, a pawl engaging said ratchet, means for automatically disengaging said pawl from the ratchet segment at the end of the movement of said segment, and a manually operable pawl-releasing device.

62. In a calculating mechanism, a series of finger key members, indicators actuated thereby, a shaft having means whereby operation of one finger key member will prevent operation of another finger key member and means whereby said shaft must be given its complete actuation before it can be released for a second operation, said means comprising a ratchet segment secured to the shaft and having a pin or projection at the end of the series of teeth thereof, a pawl engaging said ratchet segment, a catch for said pawl, said catch being mounted to be engaged by the segment at one extreme of movement to release the pawl, the said pawl being adapted to be engaged by said catch when the pin engages the pawl, and a manually operable pawl-releasing device.

63. In a calculating mechanism, a series of finger key levers each having a downwardly extending stop, said stops being at different distances from the pivots of said levers, indicators actuated by said levers, and means for restraining undue movement of the indicator actuating mechanism, said means including a detent bar adapted to engage the stop of any key lever which has been depressed.

64. In a calculating mechanism, a series of finger key levers each having a downwardly extending stop, said stops being at different distances from the pivots of said levers, indicators actuated by said levers, and means for restraining undue movement of the indicator actuating mechanism, said means including a rockshaft for actuating the indicator, and a detent bar adapted to engage the stop of any key lever which has been depressed, the detent bar being connected to the rockshaft to limit movement of the latter to the extent permitted by said detent bar.

65. In a calculating mechanism, a series of indicators, slides for actuating said indicators, and selective mechanism for controlling the actuation of individual slides, said selective mechanism including an abutment movable transversely of each slide, a spring movable with the slide and bearing against one end of the abutment, and a yielding lever bearing on the other end of the abutment.

66. In a calculating mechanism, a series of indicators, slides for actuating said indicators, and selective mechanism for controlling the actuation of individual slides, said selective mechanism including an abutment movable transversely of each slide, a spring movable with the slides and bearing against one end of the abutment, a yielding lever bearing on the other end of the abutment, and a relatively movable stop to hold each abutment from being shifted by the yielding lever until said stop moves out of the way.

In testimony whereof we have affixed our signatures, in presence of two witnesses.

EDWARD H. PALMER.
WILLIAM S. KINSLEY.

Witnesses:
A. W. HARRISON,
FRED M. COOK.